(12) United States Patent
Rajpara

(10) Patent No.: US 11,520,844 B2
(45) Date of Patent: Dec. 6, 2022

(54) CONTINUOUS LEARNING, PREDICTION, AND RANKING OF RELEVANCY OR NON-RELEVANCY OF DISCOVERY DOCUMENTS USING A CASEASSIST ACTIVE LEARNING AND DYNAMIC DOCUMENT REVIEW WORKFLOW

(71) Applicant: Casepoint, LLC, Tysons, VA (US)

(72) Inventor: Vishalkumar Rajpara, Tysons, VA (US)

(73) Assignee: Casepoint, LLC, Tysons, VA (US)

( * ) Notice: Subject to any disclaimer, the term of this patent is extended or adjusted under 35 U.S.C. 154(b) by 0 days.

(21) Appl. No.: 17/229,389

(22) Filed: Apr. 13, 2021

(65) Prior Publication Data

US 2022/0327173 A1 Oct. 13, 2022

(51) Int. Cl.
*G06F 16/9535* (2019.01)
*G06F 16/93* (2019.01)
*G06F 16/901* (2019.01)

(52) U.S. Cl.
CPC ...... *G06F 16/9535* (2019.01); *G06F 16/9024* (2019.01); *G06F 16/93* (2019.01)

(58) Field of Classification Search
CPC ............... G06F 16/9535; G06F 16/93; G06F 16/9024; G06N 20/00
USPC ........................................................ 707/706
See application file for complete search history.

(56) References Cited

U.S. PATENT DOCUMENTS

| | | | |
|---|---|---|---|
| 2011/0184896 A1* | 7/2011 | Guyon | G06K 9/6231 706/12 |
| 2012/0265762 A1* | 10/2012 | Wade | G06V 30/224 707/741 |
| 2013/0013996 A1* | 1/2013 | Wu | G06F 16/93 715/227 |
| 2013/0297612 A1* | 11/2013 | Ravid | G06F 16/35 707/740 |
| 2014/0188857 A1* | 7/2014 | Steiner | G06F 16/58 707/723 |
| 2014/0244524 A1* | 8/2014 | Brestoff | G06F 40/211 705/311 |
| 2014/0280238 A1* | 9/2014 | Cormack | G06F 16/285 707/749 |
| 2015/0081278 A1* | 3/2015 | Unno | G06F 40/274 704/9 |

(Continued)

*Primary Examiner* — James Trujillo
*Assistant Examiner* — Antonio J Caiado
(74) *Attorney, Agent, or Firm* — IP Spring

(57) ABSTRACT

A method includes receiving a set of documents associated with data discovery. The method further includes receiving, for each document in a subset of the set of documents, an indication of relevancy or non-relevancy of the document for an issue. The method further includes modifying one or more parameters for a machine-learning model based on the indication of relevancy or non-relevancy. The method further includes outputting, for each document in the set of documents, by a machine-learning model, a prediction probability of relevancy to an issue associated with the data discovery, and a ranking of the set of documents based on the prediction probability of relevancy. The method further includes generating a user interface that includes a sampling of the documents for review by a user, where each document is associated with a predicted relevancy tag or a predicted non-relevancy tag.

16 Claims, 17 Drawing Sheets

(56) References Cited

U.S. PATENT DOCUMENTS

| | | | |
|---|---|---|---|
| 2015/0324451 A1* | 11/2015 | Cormack | G06N 20/00 |
| | | | 706/11 |
| 2016/0299955 A1* | 10/2016 | Jain | G06F 16/313 |
| 2018/0025303 A1* | 1/2018 | Janz | G16H 50/20 |
| | | | 705/2 |
| 2018/0232702 A1* | 8/2018 | Dialani | G06Q 10/1053 |
| 2018/0329982 A1* | 11/2018 | Patel | G06F 40/211 |
| 2020/0097560 A1* | 3/2020 | Kulkarni | G06F 16/248 |
| 2020/0192920 A1* | 6/2020 | Filonov | G06N 5/003 |
| 2020/0249784 A1* | 8/2020 | St. Clair | G06Q 50/01 |
| 2020/0327373 A1* | 10/2020 | Tecuci | G06K 9/6263 |
| 2021/0142433 A1* | 5/2021 | Eidelman | G06Q 50/18 |
| 2022/0020026 A1* | 1/2022 | Wadhwa | G06Q 20/4016 |

* cited by examiner

Data Store: Review

Batches

BBC Dataset CAL DBW

410 — Accept Batch

BBCCAL_0021
BBCCAL_0022
BBCCAL_0023
BBCCAL_0024
BBCCAL_0025
BBCCAL_0026
BBCCAL_0027
BBCCAL_0028
BBCCAL_0029
BBCCAL_0030
BBCCAL_0031
BBCCAL_0032
BBCCAL_0033

405

Search content...

| ☐ | No | ⊘ | ⌕ | Doc ID | File Name/Subject | File ext | Doc date |

Batch Details    Completed

Batch Name
BBCCAL_0021

Reviewed Docs / Total Docs
[20/20]

Phase Tag
Phase_BBC Dataset CAL DRW

Assigned To
v@casepoint.com

Created by:
v@casepoint.com

Created Date
03/04/2021

Accepted
Completed
Remaining Documents
Delete

BBC Dataset

| Configuration | Dashboard | History |

Would you like to save this story and continue with the selected workflow?

BBC Dataset

SOURCE CLASS

Story Type  ○ Relevant   ○ Relevant/Non-Relevant   ● Multiple

Select Work Product

Tags [ ˅ ]

Select Tags

[ Confidential X ] [ Attorney Client X ] [ Work Product X ]

SAMPLING CRITERIA

Confidence level  ● 95%  ○ 99%   Margin of Error %  [ 5 ]

SELECT DOCUMENTS FOR PREDICTION AND RANKING

Select Folder [ Select Folder ]

SYSTEM LEARNING AND RANKING

Ranking                                              [ Re-Rank ]

Verify Model every [ 100 ] Docs    Re-Rank if Accuracy < [ 90 ] %

Relevant Document                  Non-Relevant Document

High Relevant – Rank > [ 80 ˅ ]    Low Non-Relevant – Rank > [ 30 ˅ ]

Low Relevant – Rank > [ 50 ˅ ]     High Non-Relevant – Rank > [ 10 ˅ ]

Assign Role

| | Role Name | |
|---|---|---|
| ☐ | Client Admin | View/Edit ˅ |
| ☐ | CP Processing | View/Edit ˅ |
| ☐ | CP Processing Lead | View/Edit ˅ |
| ☐ | External Audit | View/Edit ˅ |
| ☐ | Workspace Admin | View/Edit ˅ |

CaseAssist

BBC Dataset ⌄

Total Documents
2966
Excluded
  Dual Tag  1
  Non Indexed  0
  No Text  2

Learning
Reviewed Relevant  205
Predicted as Non-Relevant  60

Reviewed Non-Relevant  381
Predicted as Relevant  41

Ranking
Relevant  212
  High Relevant  0
  Low Relevant  212

Non-Relevant  2164
  Low Non-Relevant  808
  High Non-Relevant  1356

Verification
Predicted Relevant  10
Verified as Non-Relevant  2
Predicted Non-Relevant  10
Verified as Relevant  2

Search content...

■ Search result [ 0 ]

| No | 🔖 | Doc ID | File Name/Subject | File ext | Doc date |
|---|---|---|---|---|---|
| 1 | | WS00425 | | | |
| 2 | | WS00426 | | | |
| 3 | | WS00427 | | | |
| 4 | | WS00428 | | | |
| 5 | | WS00429 | | | |
| 6 | | WS00430 | | | |
| 7 | | WS00431 | | | |
| 8 | | WS00432 | | | |
| 9 | | WS00433 | | | |
| 10 | | WS00434 | | | |
| 11 | | WS00435 | | | |
| 12 | | WS00436 | | | |

Sampling Criteria
Confidence Level (%) 95
Margin of Error (%) 5
Total Documents 212 — 1105

Sample Document 137

Generate Verification/
QC set — 1110

1100

CONTINUOUS LEARNING, PREDICTION, AND RANKING OF RELEVANCY OR NON-RELEVANCY OF DISCOVERY DOCUMENTS USING A CASEASSIST ACTIVE LEARNING AND DYNAMIC DOCUMENT REVIEW WORKFLOW

BACKGROUND

Data discovery searches are used in a variety of applications. For example, data discovery searches are typically used in legal discovery during a lawsuit. During legal discovery, a user may need to review electronic documents and then identify those electronic documents that contain particular text that is of relevance to issues in a lawsuit. Such a discovery process can be overwhelming due to potentially thousands of documents that need to be searched, reviewed, and identified.

For example, most legal actions start with someone hearing about an issue. The issue is communicated to counsel via forwarded emails, attached documents, etc. The content may be a pleading that has been filed or it may be a rumor going around the office. The emails and attachments associated with the emails may contain a treasure-trove of information that can accelerate an assessment of a legal matter.

SUMMARY

Embodiments generally relate to a computer-implemented method to train a machine-learning model. A method includes receiving a set of documents associated with data discovery. The method further includes outputting for each document in the set of documents, by a machine-learning model, a prediction probability of relevancy to an issue associated with the data discovery, and a ranking of the set of documents based on the prediction probability of relevancy. The method further includes generating a user interface that includes a sampling of the documents for review by a user, wherein each document in the sampling of the documents is associated with a predicted relevancy tag or a predicted non-relevancy tag.

In some embodiments, the method further includes receiving an indication of relevancy or non-relevancy of at least a subset of the sampling of the documents from the user, modifying one or more parameters of the machine-learning model based on the indication of relevancy or non-relevancy, and after the modifying, outputting for each document in the set of documents, by the machine-learning model, an updated prediction probability of relevancy to the issue, and a reranking of the set of documents based on the updated prediction probability of relevancy. In some embodiments, the method further comprises updating the user interface to include a graph of stability of the machine-learning model based on the ranking and the reranking, an agreement ratio between the machine-learning model and the user, and a change ratio. In some embodiments, before outputting the prediction probability of relevancy and ranking, the method further comprises: receiving, for each document in a subset of the set of documents, an indication of relevancy or non-relevancy for the issue and modifying one or more parameters of the machine-learning model based on the indication of relevancy or non-relevancy. In some embodiments, the issue is a first issue, the subset is a first subset, the machine-learning model is a first machine-learning model, and the method further comprises: receiving, for each document in a second subset of the set of documents, an indication of relevancy or non-relevancy for a second issue different from the first issue and outputting for each document in the set of documents, by a second machine-learning model, a second prediction probability of relevancy to the second issue. In some embodiments, the user interface further includes a graph of a number of the set of documents as a function of the prediction probability and the method further comprises: receiving, from the user, a selection of a span of prediction probabilities in the graph and a request to verify corresponding documents that are within the span of prediction probabilities and modifying the user interface to include one or more of the corresponding documents for the user to verify relevancy or non-relevancy. In some embodiments, the user interface further includes a summary of the ranking of the set of documents and the summary includes a number of relevant documents, a number of high-relevant documents, a number of low-relevant documents, a number of non-relevant documents, a number of low non-relevant documents, and a number of high non-relevant documents. In some embodiments, criteria for definition of the number of high-relevant documents, the number of low-relevant documents, the number of low non-relevant documents, and the number of high non-relevant documents is configurable by the user. In some embodiments, the method further comprises: receiving, from the user, a request to verify one of the number of relevant documents, the number of high-relevant documents, the number of low-relevant document, the number of non-relevant documents, the number of low non-relevant documents, or the number of high non-relevant documents and modifying the user interface to include corresponding documents from the request for the user to verify relevancy or non-relevancy.

In some embodiments, a system includes one or more processors coupled to a memory and a memory coupled to the processor, with instructions stored thereon that, when executed by the processor, cause the processor to perform operations comprising: receiving a set of documents associated with data discovery, outputting for each document in the set of documents, by a machine-learning model, a prediction probability of relevancy to an issue associated with the data discovery, and a ranking of the set of documents based on the prediction probability of relevancy, and generating a user interface that includes a sampling of the documents for review by a user, wherein each document in the sampling of the documents is associated with a predicted relevancy tag or a predicted non-relevancy tag. In some embodiments, the method further includes receiving a set of new documents associated with the data discovery, receiving, for each document in a subset of new documents, an indication of relevancy or non-relevancy of the document, modifying the one or more parameters of the machine-learning model based on the indication of relevancy or non-relevancy, and after the modifying, outputting for each document in the set of documents, by the machine-learning model, an updated prediction probability of relevancy, and a reranking of the set of documents based on the prediction probability of relevancy; wherein the set of documents includes the set of new documents.

In some embodiments, the operations further comprise: receiving an indication of relevancy or non-relevancy of at least a subset of the sampling of the documents from the user, modifying one or more parameters of the machine-learning model based on the indication of relevancy or non-relevancy, and after the modifying, outputting for each document in the set of documents, by the machine-learning model, an updated prediction probability of relevancy to the issue, and a reranking of the set of documents based on the updated prediction probability of relevancy. In some embodiments, the operations further comprise updating the user interface to include a graph of stability of the machine-learning model based on the ranking and the reranking, an agreement ratio between the machine-learning model and the user, and a change ratio. In some embodiments, before outputting the prediction probability of relevancy and ranking, the operations further comprise: receiving, for each document in a subset of the set of documents, an indication of relevancy or non-relevancy for the issue and modifying one or more parameters of the machine-learning model based on the indication of relevancy or non-relevancy. In some embodiments, the user interface further includes a graph of a number of the set of documents as a function of the prediction probability and the operations further comprise: receiving, from the user, a selection of a span of prediction probabilities in the graph and a request to verify corresponding documents that are within the span of prediction probabilities and modifying the user interface to include one or more of the corresponding documents for the user to verify relevancy or non-relevancy. In some embodiments, the user interface further includes a summary of the ranking of the set of documents and the summary includes a number of relevant documents, a number of high-relevant documents, a number of low-relevant documents, a number of non-relevant documents, a number of low non-relevant documents, and a number of high non-relevant documents.

A non-transitory computer-readable medium may include instructions stored thereon that, when executed by one or more computers, cause the one or more computers to perform operations, the operations comprising: receiving a set of documents associated with data discovery, outputting for each document in the set of documents, by a machine-learning model, a prediction probability of relevancy to an issue associated with the data discovery, and a ranking of the set of documents based on the prediction probability of relevancy, and generating a user interface that includes a sampling of the documents for review by a user, wherein each document in the sampling of the documents is associated with a predicted relevancy tag or a predicted non-relevancy tag.

In some embodiments, the operations further comprise: receiving an indication of relevancy or non-relevancy of at least a subset of the sampling of the documents from the user, modifying one or more parameters of the machine-learning model based on the indication of relevancy or non-relevancy, and after the modifying, outputting for each document in the set of documents, by the machine-learning model, an updated prediction probability of relevancy to the issue, and a reranking of the set of documents based on the updated prediction probability of relevancy. In some embodiments, the operations further comprise updating the user interface to include a graph of stability of the machine-learning model based on the ranking and the reranking, an agreement ratio between the machine-learning model and the user, and a change ratio. In some embodiments, before outputting the prediction probability of relevancy and ranking, the operations further comprise: receiving, for each document in a subset of the set of documents, an indication of relevancy or non-relevancy for the issue and modifying one or more parameters of the machine-learning model based on the indication of relevancy or non-relevancy. In some embodiments, the user interface further includes a graph of a number of the set of documents as a function of the prediction probability and the operations further comprise: receiving, from the user, a selection of a span of prediction probabilities in the graph and a request to verify corresponding documents that are within the span of prediction probabilities and modifying the user interface to include one or more of the corresponding documents for the user to verify relevancy or non-relevancy.

The specification provides a solution for the problem with organizing an overwhelming amount of information. First, the specification describes training a machine-learning model based on a user tagging (i.e., labelling) documents as relevant or non-relevant and modifying parameters in response to the tagging. Second, the specification describes using a machine-learning model to output a prediction of the relevancy of documents and a ranking of the documents. Third, the specification describes a user interface that identifies a subset of the documents tagged by the machine-learning model for the user to review in order to verify the accuracy of the machine-learning model. Third, the machine-learning model uses the verification from the user to output a reranking of the documents.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 illustrates an example user interface that enables a user to accept batches to add to the set of documents according to some embodiments.

FIG. 5 illustrates an example user interface that enables a user to tag documents as relevant or non-relevant according to some embodiments.

FIG. 11 illustrates an example user interface that enables a user to verify a subset of the documents according to some embodiments.

DETAILED DESCRIPTION

Overview

In some embodiments, a discovery application enables the refinement of a machine-learning model that predicts the relevancy to an issue associated with data discovery of a set of documents. In some embodiments, a discovery application trains a machine-learning model by receiving a set of documents associated with data discovery and receiving an indication of relevancy or non-relevancy of a subset of the set of documents. The discovery application adjusts one or more parameters of the machine-learning model based on the indication of relevancy or non-relevancy.

Once the subset of the set of documents is labelled by a user, the machine-learning model outputs for each document a prediction probability of relevancy to an issue associated with the data discovery. For example, the output may be a prediction that a particular document is relevant or non-relevant to privilege, a breach of contract issue, intentional infliction of emotional distress, etc.

In some embodiments, the discovery application generates and provides a user interface that includes a sampling of the documents for review by a user where each document in the set of documents is associated with a predicted relevancy tag (i.e., a label) or a predicted non-relevancy tag. The sampling may be configured by the user or the machine-learning model. The user may provide indications of relevancy or non-relevancy for at least a subset of the sampling of the documents from the user. Upon receipt of the indications, the discovery application may modify parameters of the machine-learning model based on the indications of relevancy or non-relevancy.

The machine-learning model may also output a ranking of the set of documents based on the prediction probability of relevancy. One or more of the documents may be categorized as being high-relevant documents, low-relevant documents, low non-relevant documents, or high non-relevant documents. In some embodiments, a user interface may include options to configure the criteria for definition of documents as being one of those previous categories. The user interface may also include an option for reviewing the documents associated with each of the previous categories for verification.

The user interface may also include a graph of a number of the set of documents as a function of the prediction probability. In some embodiments, the user interface includes an option for selecting a span of prediction probabilities in the graph and a request to verify corresponding documents that are within the span of prediction probabilities. This may be advantageous for selecting documents around the 48-52% relevancy prediction (or other ranges near the cutoff between relevant/non-relevant) where the accuracy of classification may be lower than for probabilities that are more certain, e.g., 10% relevancy prediction (unlikely to be relevant) or 85% relevancy prediction (very likely to be relevant).

Example System

Figure 1:
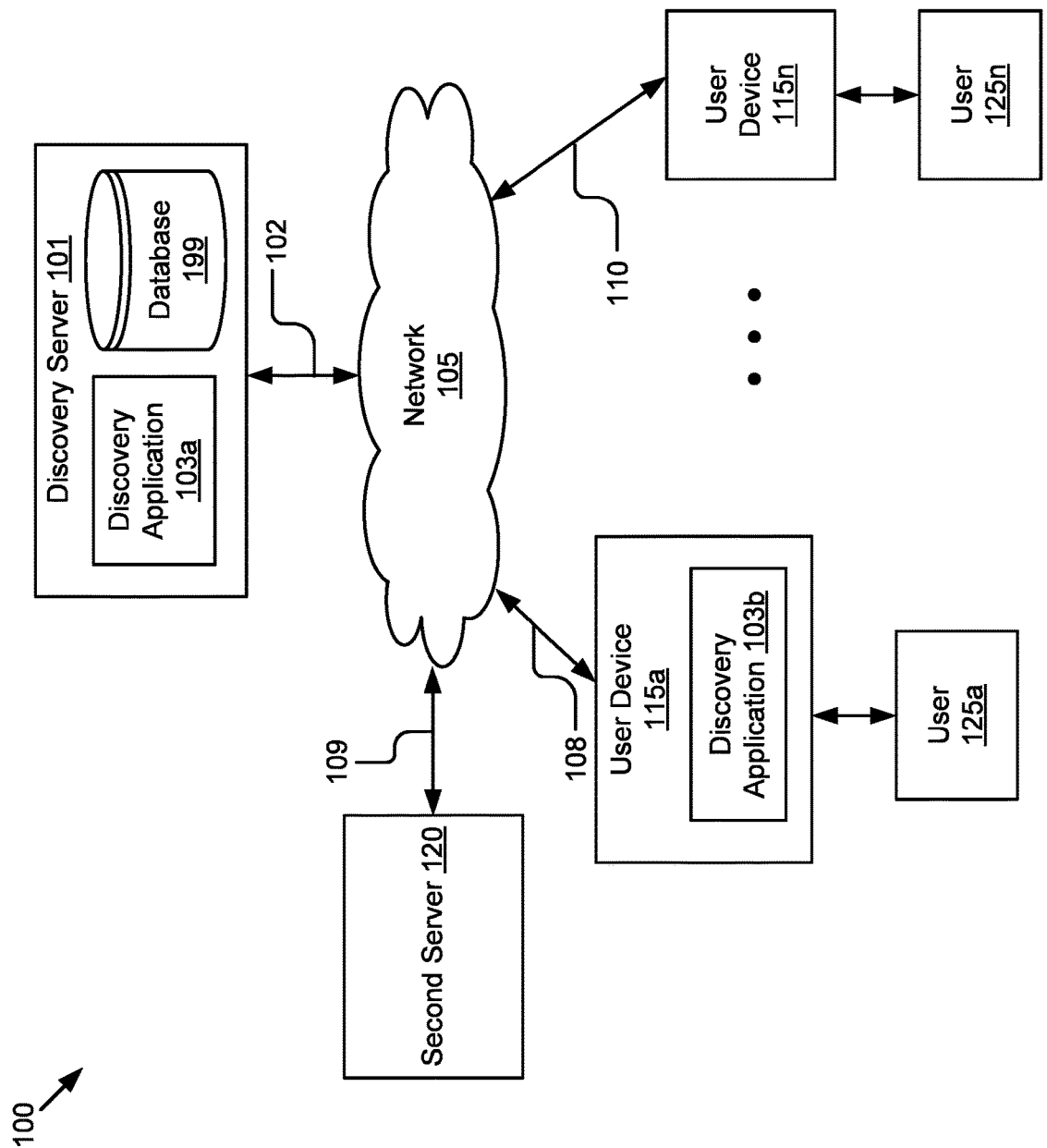
FIG. 1 illustrates a block diagram of an example network environment that ranks a set of documents according to some embodiments.

FIG. 1 illustrates a block diagram of an example network environment 100 in which a set of documents is made available for review and ranked accordingly, according to some embodiments. Environment 100 includes a discovery server 101, user devices 115a, 115n, and a second server 120, all coupled via a network 105. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The discovery server 101 may include a processor, a memory, and network communication capabilities. In some embodiments, the discovery server 101 is a hardware server. The discovery server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the discovery server 101 sends and receives data to and from one or more of the user devices 115a, 115n and the second server 120 via the network 105. The discovery server 101 may include a discovery application 103a and a database 199.

The discovery application 103a may include code and routines operable to organize data discovery documents, determine relevancy of the documents to one or more issues, and to rank the documents. In some embodiments, the discovery application 103a may be implemented using hardware including a field-programmable gate array (FPGA) or an application-specific integrated circuit (ASIC). In some embodiments, the discovery application 103a may be implemented using a combination of hardware and software. The database 199 may store data discovery documents, tags, user profiles, etc.

The user device 115 may be a computing device that includes a memory and a hardware processor. For example, the user device may include a desktop computer, a mobile device, a tablet computer, a mobile telephone, a wearable device, a head-mounted display, a mobile email device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to an environment having one or more user devices 115.

In some embodiments, discovery application 103b may be stored on a user device 115a. The discovery application 103 may include a thin-client discovery application 103b stored on the user device 115a and a discovery application 103a that is stored on the discovery server 101. For example, the discovery application 103b stored on the user device 115a may display a user interface that includes information about the data discovery documents. A user may be able to interact with the user interface to provide user input, for example, by uploading additional data discovery documents, providing the discovery application 103b with a name of a person involved in a lawsuit, tag data discovery documents as privileged, etc. The user device 115a may transmit the user input to the discovery application 103a stored on the discovery server 101. The discovery application 103a stored on the discovery server 101 may receive the user input and further organize the data discovery documents based on the user input. For example, responsive to the user uploading the additional data discovery documents, the discovery application 103a may recategorize the data discovery documents based on the additional data discovery documents.

In some embodiments, the user device 115 may not include a discovery application 103 and instead, a general-purpose browser application is used to view a user interface generated by the discovery application 103a on discovery server 101. In some embodiments, functionality of the discovery application 103a on the discovery server 101 may be included in the discovery application 103b of the user device 115, e.g., the user device 115 may itself perform various functions such as receiving documents, determining relevancy, ranking documents, generating a user interface, etc. Thus, in various embodiments, the discovery application 103 may be a client-server application (e.g., as illustrated in FIG. 1), a server-side application accessed by a generic client (e.g., a browser or other application), or a client-side application that executes locally on a user device.

The second server 120 may include a processor, a memory, and network communication capabilities. The second server 120 may access the network 105 via signal line 109. The second server 120 may include an application that provides a service. For example, the second server 120 may include an electronic encyclopedia, dictionary, thesaurus, etc. The second server 120 may receive a request from the discovery application 103 for additional information from the discovery application, such as information about concepts that are similar to the term "market." The second server 120 may provide the requested information to the discovery application.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the discovery server 101, in practice one or more networks 105 may be coupled to these entities.

Example Computing Device

Figure 2:
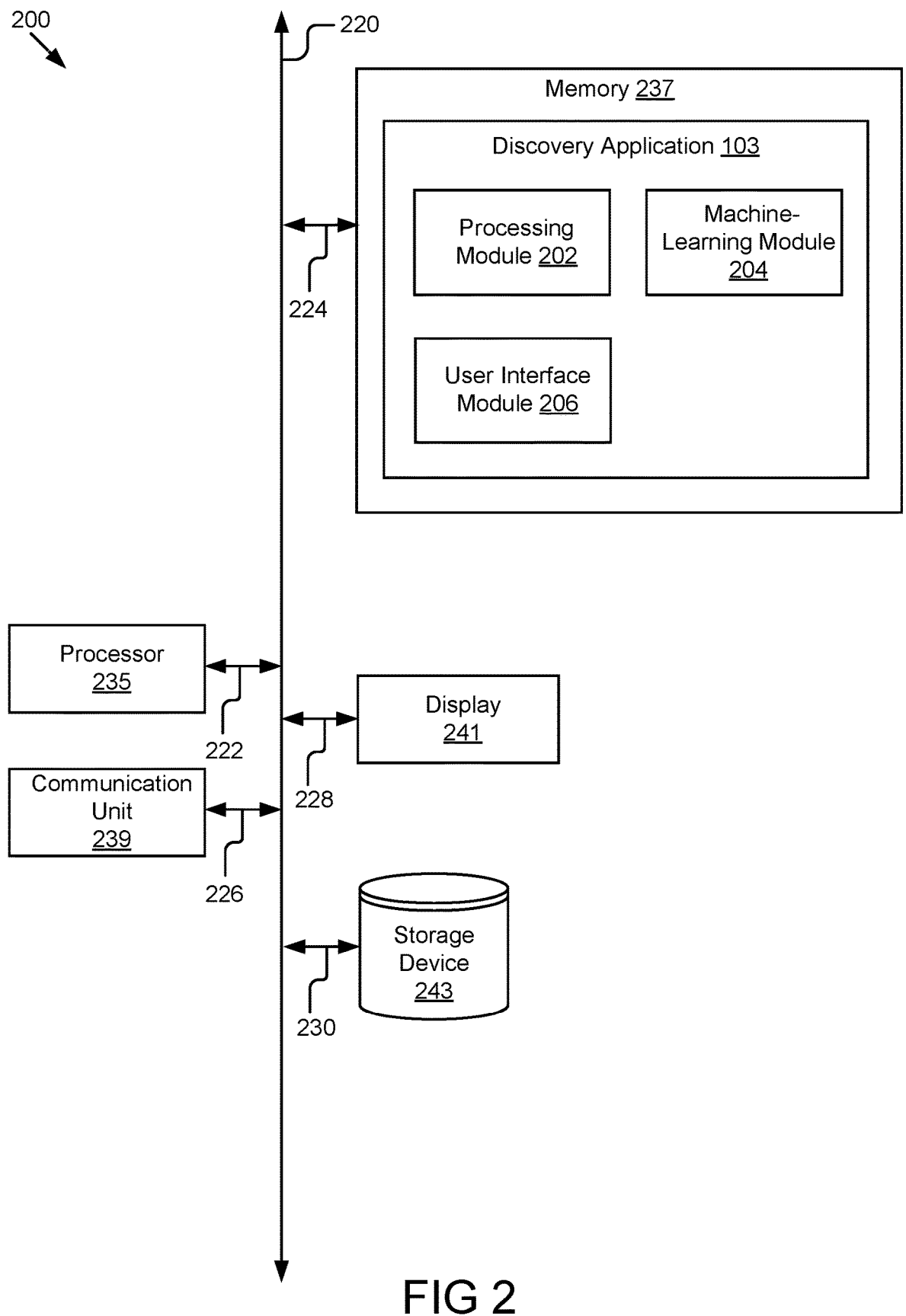
FIG. 2 illustrates a block diagram of an example computing device that ranks a set of documents according to some embodiments.

FIG. 2 illustrates a block diagram of an example computing device 200 that outputs prediction probabilities of relevancy and a ranking of data discovery documents. The computing device 200 may be a discovery server 101 or a user device 115. The computing device 200 may include a processor 235, a memory 237, a communication unit 239, a display 241, and a storage device 243. Additional components may be present or some of the previous components may be omitted depending on the type of computing device 200. For example, if the computing device 200 is the discovery server 101, the computing device 200 may not include the display 241. A discovery application 103 may be stored in the memory 237. In some embodiments, the computing device 200 may include other components not listed here, such as a battery, etc. The components of the computing device 200 may be communicatively coupled by a bus 220.

The processor 235 includes an arithmetic logic unit, a microprocessor, a general-purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the discovery application 103, which is described in greater detail below. The memory 237 is coupled to the bus 220 for communication with the other components via signal line 224.

The communication unit 239 transmits and receives data to and from at least one of the user device 115 and the discovery server 101 depending upon where the discovery application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the discovery server 101, depending on where the discovery application 103 may be stored. In some embodiments, the communication unit 239 includes a wireless transceiver for exchanging data with the user device 115, discovery server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), etc.

The display 241 may include hardware operable to display graphical data received from the discovery application 103. For example, the display 241 may render graphics to display an overlay and a resulting composite image. The display 241 is coupled to the bus 220 for communication with the other components via signal line 228.

The storage device 243 may be a non-transitory computer-readable storage medium that stores data that provides the functionality described herein. In embodiments where the computing device 200 is the discovery server 101, the storage device 243 may include the database 199 in FIG. 1. The storage device 243 may be a DRAM device, a SRAM device, flash memory or some other memory device. In some embodiments, the storage device 243 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 243 is coupled to the bus 220 for communication with the other components via signal line 230.

The discovery application 103 may include a processing module 202, a machine-learning module 204, and a user interface module 206.

The processing module 202 processes data discovery documents. In some embodiments, the processing module 202 includes a set of instructions executable by the processor 235 to process the data discovery documents. In some embodiments, the processing module 202 is stored in the memory 237 of the computing device 200 and can be accessible and executable by the processor 235.

The processing module 202 may receive a set of documents related to data discovery issues. For example, the data discovery issues may relate to compliance, backup data, organizational data, electronic discovery issues, etc. Electronic discovery issues are associated with discovery in a legal proceeding, such as a litigation, a government investigation, a Freedom of Information Act request, etc. The set of documents may include forwarded emails, attached documents, a filed pleading, etc. For example, the set of documents may be associated with a lawsuit that includes both a contract cause of action and a tort cause of action. The processing module 202 may receive the set of documents from a single user, such as a project manager, or from multiple users.

The processing module 202 processes the set of documents. The processing module 202 may identify metadata associated with the set of documents. For example, the processing module 202 may identify a type of document, a date of creation of the document, dates that the document was modified, an identify of one or more individuals that modified the document, etc.

In some embodiments, the processing module 202 identifies information within the set of documents that is relevant for the data discovery process. For example, the processing module 202 may identify the following information from the set of documents: names of people, dates of events, content-rich documents, near-duplicate pivot documents, a starting point for a network of communications, privilege communication parties, and key terms. The processing module 202 may identify the names of people and a category associated with the name of people. For example, the processing module 202 may identify a type of user as a key custodian, an attorney, general counsel, a name of a law firm, etc. The processing module 202 may identify the communication parties by, for example, identifying the names of outside counsel. The processing module 202 may identify key terms in the set of documents, such as key terms that might be associated with a cause of action, a date that is significant for a particular lawsuit, an activity that could indicate guilt or liability, etc. The processing module 202 may index the set of documents based on the metadata and/or other information identified in the set of documents, such as the key terms.

In some embodiments, the set of documents includes all documents processed by the discovery application 103. The set of documents may be related to multiple data discovery issues associated with the same data discovery issue, such as the same lawsuit. For example, a first issue may be a first cause of action in the lawsuit (e.g., fraud), a second issue may be a second cause of action in the lawsuit (e.g., unjust enrichment), and a third issue may be whether the documents are privileged or non-privileged.

In some embodiments, the processing module 202 may receive updated documents related to a data discovery issue. For example, the data discovery issue may be initiated by a cease and desist letter, but later a complaint and pleadings may be available. The processing module 202 processes the updated documents.

In some embodiments, the machine-learning module 204 trains a machine-learning model to output prediction probabilities of relevancy, a ranking of a set of documents based on the relevancy of the documents, and a reranking based on user verification of the relevancy tags output by the machine-learning model. In some embodiments, the machine-learning module 204 includes a set of instructions executable by the processor 235 to train the machine-learning model. In some embodiments, the machine-learning module 204 is stored in the memory 237 of the computing device 200 and can be accessible and executable by the processor 235.

In some embodiments, the machine-learning module 204 uses training data to modify one or more the parameters of a machine-learning model. For example, training data may include any type of data such as a set of documents associated with a data discovery issue where each document is tagged as relevant or non-relevant for a particular issue. The particular issue may include anything in electronic discovery, such as whether a document is privileged or non-privileged or whether a document relates to a cause of action (e.g., whether a document relates to breach of contract, malpractice, breach of fiduciary duty, etc.).

Training data may be obtained from any source, e.g., a data repository specifically marked for training, data that was manually tagged by a user, data that was tagged during an actual lawsuit, data for which permission is provided for use as training data for machine-learning, etc. In some embodiments, one or more parameters of the machine-learning model of the machine-learning module 204 are automatically updated based on the training input indicating the relevancy or non-relevancy of a document.

In some embodiments, training data may include synthetic data generated for the purpose of training, such as data that is not based on activity in the context that is being trained, e.g., data generated from simulated sets of documents for lawsuits. In some embodiments, the machine-learning module 204 uses weights that are taken from another application and are unedited/transferred. For example, in these embodiments, the machine-learning model may be trained, e.g., on a different device, and be provided as part of the discovery application 103. In various embodiments, the machine-learning model may be provided as a data file that includes a model structure or form (e.g., that defines a number and type of neural network nodes, connectivity between nodes and organization of the nodes into a plurality of layers), and associated weights. The machine-learning module 204 may read the data file for the machine-learning model and implement neural networks with node connectivity, layers, and weights based on the model structure or form specified in the machine-learning model.

In some embodiments, the machine-learning module 204 is configured to apply the machine-learning model to data (e.g., a set of documents from the processing module 202) to output prediction probabilities of relevancy and a ranking of a set of documents based on relevancy. In some embodiments, the machine-learning module 204 may include software code to be executed by processor 235. In some embodiments, the machine-learning module 204 may specify circuit configuration (e.g., for a programmable processor, for a field programmable gate array (FPGA), etc.) enabling the processor 235 to apply the machine-learning model. In some embodiments, the machine-learning module 204 may include software instructions, hardware instructions, or a combination. In some embodiments, the machine-learning module 204 may offer an application programming interface (API) that can be used by an operating system and/or other applications to invoke the machine-learning module 204, e.g., to apply the machine-learning model to application data to output the ranking of the set of documents.

In some embodiments, the machine-learning model may include one or more model forms or structures. For example, model forms or structures can include any type of neural-network, such as a linear network, a deep neural network, a convolutional neural network (CNN), a sequence-to-sequence neural network, etc. or other type of machine-learning model form/structure.

In some embodiments, training may include supervised learning techniques. For example, the machine-learning module 204 may receive, as input, the set of documents and tags from a user (i.e., labels) that indicate relevancy or non-relevancy of each document for an issue related to electronic discovery. The machine-learning module 204 may also receive a probability of relevancy to an issue for each document and a ranking of the set of documents based on the probability of relevancy for each document.

In some embodiments, training may include unsupervised learning techniques. For example, the machine-learning module 204 may receive the set of documents and an issue related to electronic discovery as input and may use different techniques, such as clustering, to identify differences between documents. In this example, the machine-learning module 204 may determine a prediction probability of relevancy or non-relevancy based on the differences between documents.

In some embodiments, the machine-learning module 214 may use multiple training sets where each training set relates to a different issue. For example, the machine-learning module 214 may receive a first training set of indications of relevancy or non-relevancy for a first issue and a second training set of indications of relevancy or non-relevancy for a second issue. The machine-learning module 214 may modify a first machine-learning model based on the first training set to output a first prediction probability of relevancy for a set of documents and a first ranking. The machine-learning module 214 may modify a second machine-learning model based on the second training set to output a second prediction probability of relevancy for the set of documents and a second ranking.

The user interface module 206 generates graphical data to display a user interface. In some embodiments, the user interface module 206 includes a set of instructions executable by the processor 235 to generate the graphical data. In some embodiments, the user interface module 206 is stored in the memory 237 of the computing device 200 and can be accessible and executable by the processor 235.

In some embodiments, the user interface module 210 receives instructions from the processing module 202 to generate a user interface. The user interface module 210 generates the user interface and presents it to a user, for example, by instructing the discovery application 103*b* to display the user interface on a user device 115 or generating the user interface via the discovery server 101 for display as webpage viewable via a browser on a user device 115.

In some embodiments, the user interface module 206 generates a different user interface depending on the type of user. For example, the user may be a custodian that reviews documents, an administrator that assigns data discovery documents to custodians to review, etc. In some embodiments, a user may have multiple roles. For example, the user interface module 206 may provide an option for an administrator to also work as a custodian to review data discovery documents.

Figure 3:
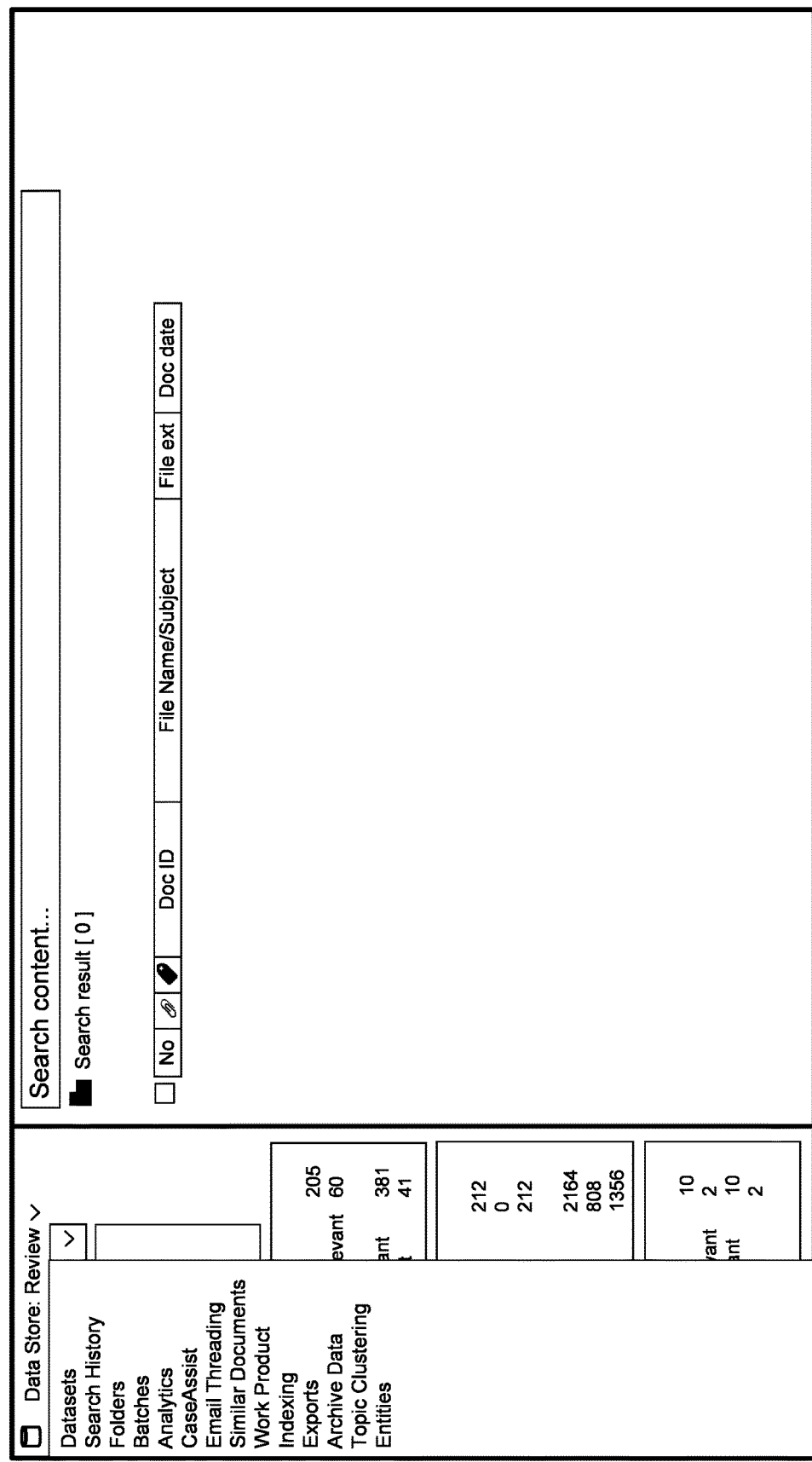
FIG. 3 illustrates an example user interface that is an overview of a document discovery system according to some embodiments.

In some embodiments, the user interface module 206 generates a user interface that includes different links for functions related to document management. FIG. 3 illustrates an example user interface 300 that that is an overview of a document discovery system. In this example, the overview window 305 is a list of different functions for the discovery application 103. For example, the window 305 in this example user interface 300 includes an option to open corresponding tabs for datasets, search history, folders, batches, analytics, caseassist, email threading, similar documents, work product, indexing, exports, archive data, topic clustering, and entities.

The "datasets" tab may include information about one or more sets of documents. For example, each set may be associated with a different lawsuit or legal issue, or different datasets associated with the same lawsuit or legal issue. The "search history" tab may include search terms provided by a user or suggested by the discovery application and corresponding results. The "folders" tab may include how different data is divided. For example, a lawsuit may organized in folders based on documents associated with a keyword, date, person, etc. The "batches" tab may enable a user to upload new datasets. The "analytics" tab may provide information about the datasets, such as a prevalence of different words, a breakdown of types of files, dates for documents, people mentioned in the documents, etc. The "caseassist" tab may enable a user to create stories around the datasets. The "email threading" tab may illustrate how documents that are emails are related. The "similar documents" tab may include search results that have a predetermined similarity to matching documents from a search (e.g., 95% similar) or search results that use a synonym to the search term(s). The "work product" tab may include results that have already been tagged by the user. The "indexing" tab may include an indexed set of documents. The "exports" tab may include a way to export data and/or a list of documents that were previously exported. The "archive data" tab may include data that has been archived. The "topic clustering" tab may include different clustering options, such as clustering documents based on a prevalence of a keyword, documents that were sent around a same date, documents involving a same person, etc. The "entities" tab may include documents organized based on different entities, such as a law firm, company, person, etc.

FIG. 4 illustrates an example user interface 400 that enables a user to accept batches of documents to add to the set of documents, according to some embodiments. The user interface 400 may be displayed after a user selects the batches option illustrated in FIG. 3. In this example, the set of documents is the BBC Dataset CAL DBW and the BBCCAL_0021 to BBCCAL_0033 are each separate batches that are associated with the dataset.

In some embodiments, a user adds a batch to the set of documents and the user interface includes a window 405 that lists each document in the batch and includes a button 410 to accept the batch as part of the set of documents. In this example, a user clicking on the button 410 adds documents from the batch BBCCAL_0021 to the BBC Dataset CAL DBW. A user may decide to not accept the batch, for example, if the batch is a duplicate of another batch that was already accepted as part of the set of documents.

In some embodiments, the user interface 400 includes additional information about each of the batches. For example, a user may right click on each of the batches. In this example, the additional information for the BBC-CAL_0021 batch includes the following batch details: whether the batch has been completed, the batch name, the number of documents in the batch out of the total number of documents in the batch, a phase tag, an identity of a custodian (i.e., user) that was assigned the batch to review, an identity of a custodian that created the batch, and a creation date for the batch. The additional information may also include options to delete the batch.

Figure 5:
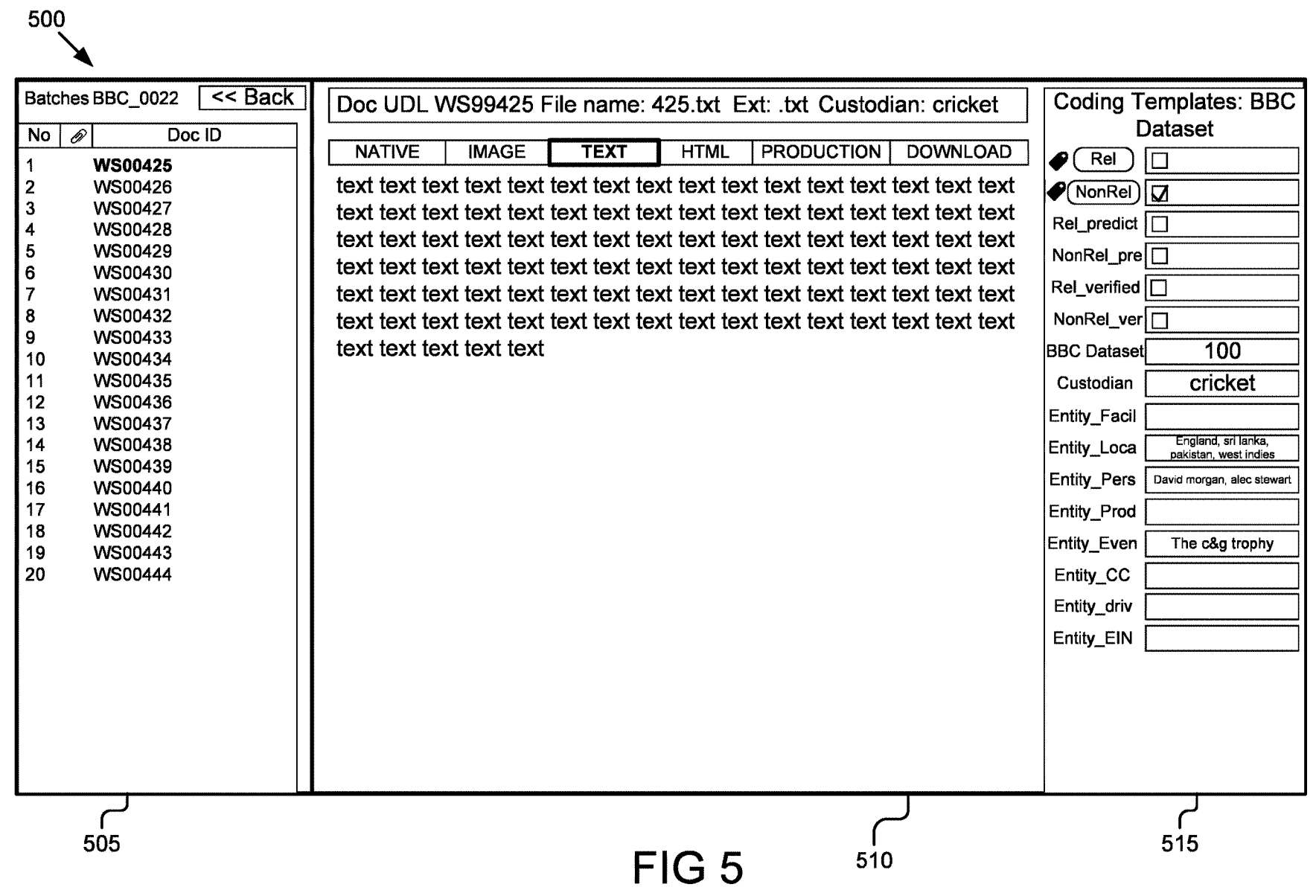

FIG. 5 illustrates an example user interface 500 that enables a user to tag documents as relevant or non-relevant according to some embodiments. In some embodiments, the user interface 500 is displayed after a user selects the "batches" tab in FIG. 3 and a batch has already been uploaded. In this example, batch BBC_0022 includes 20 documents, which are listed in the overview window 505. The document window 510 displays a selected document in various formats. In this example, the document window 510 displays the text for a document WS99425. Different formats for the document also include native, image, html, production, and download.

The tagging window 515 includes options for tagging the document as relevant or non-relevant. In this example the user tagged the document as non-relevant. The tagging window 515 also includes options for showing that a document was predicted as being relevant or non-relevant by the machine-learning model. In this example, a prediction has not yet been made, since the user has not tagged enough documents for the machine-learning model to output a prediction of relevancy. The tagging window 515 may also include a list of the different users (referred to as custodians) that are assigned to review the document. In this example, the custodian is "cricket."

Figure 6:
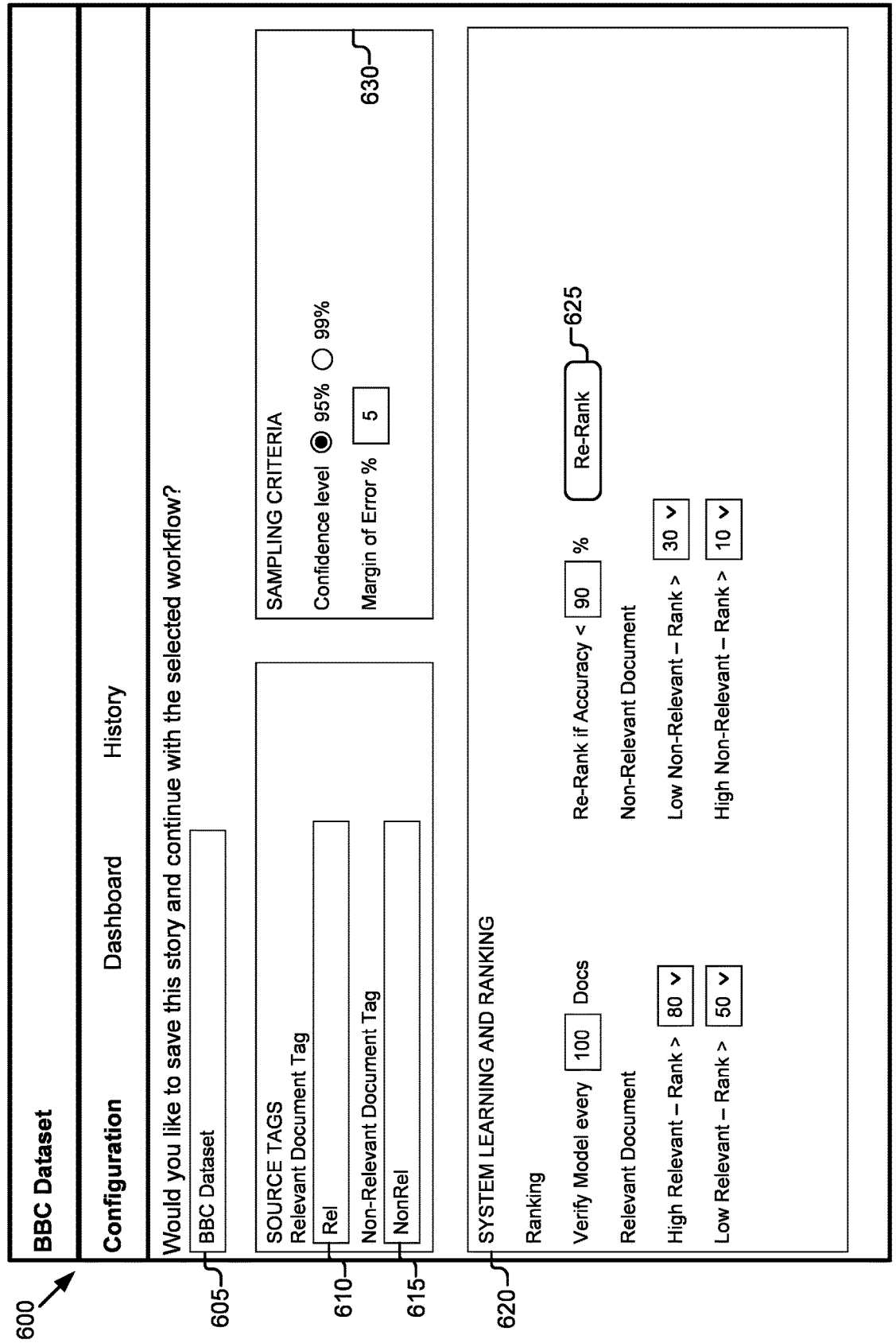
FIG. 6A illustrates an example user interface that enables a user to modify model configurations according to some embodiments.
FIG. 6B illustrates another example user interface that enables a user to modify model configurations according to some embodiments.

FIG. 6A illustrates an example user interface 600 that enables a user to modify a machine-learning model configuration according to some embodiments. In some embodiments, the user may reach the configuration tab by selecting the "caseassist" tab and then a "configuration" tab. When the machine-learning module 204 trains the machine-learning model, the machine-learning model is associated with a "story."

The user interface 600 includes four subsections: a first text field 605 for adding a name, a source tags section for configuring tags, a system learning and ranking section 620 for configuring how the machine-learning module 204 ranks the set of documents, and a sampling criteria section 630 for configuring how the machine-learning model is verified.

The user interface 600 enables a user to save the "story" by entering text in a first field 605. In this example, the story is labelled the BBC Dataset. The user interface 600 enables the user to define a name for the relevant document tag and the non-relevant document tags using the relevant document tag field 610 and the non-relevant document tag field 615, respectively. In this example the relevant document tag is configured to be "Rel" and the non-relevant document tag is configured to be "NonRel."

The user interface 600 enables the user to configure how the machine-learning module 204 ranks the set of documents in the ranking section 620. For example, a user can configure how frequently the machine-learning model (referred to as "model" in FIG. 6A) is verified. In this example, the machine-learning model is verified every time 100 more documents are reviewed by a user and marked as relevant or non-relevant if the accuracy is less than 90%. In some embodiments, there is a threshold number of documents for the user to review before the machine-learning model is build (e.g., 100, 50, 150, etc.). The accuracy is configurable by the user and is defined as agreement between the predictions output by the machine-learning model and the labels provided by the user. For example, if the user changes the predictions 25% of the time, the machine-learning model is considered to be only 75% accurate and the machine-learning module 204 re-ranks the set of documents every 100 documents.

In addition to the automatic re-ranking of the set of documents, a user may instruct the machine-learning module 204 to re-rank the set of documents by selecting the re-rank button 625. For relevant documents, the ranking section 620 includes an option to define highly relevant documents as having a relevancy of a particular prediction probability percentage (80%-100% in this example) and an option to define low relevancy as having a relevancy of greater than a particular prediction probability percentage (50% to less than 80% in this example). For non-relevant documents, the ranking section 620 includes an option to define having low non-relevancy as being greater than a particular prediction probability percentage (greater than 30% to less than 50% in this example) and an option to define high non-relevancy as being greater than a particular prediction probability percentage (greater than 10% to less than 30% in this example).

The user interface 600 enables the user to configure how the documents are sampled for verification in the sampling criteria section 630. In this example, the user may select a confidence value for the machine-learning model of either 95% or 99% and the user may manually configure the margin of error percentage. In this example, the default setting for the margin of error is 5%. These values will change the number of documents that are selected for a user to review during verification of the machine-learning model.

FIG. 6B illustrates another example user interface 650 that enables a user to modify model configurations according to some embodiments. In this embodiment, the "source class" section includes a "Story Type" subsection 655, a "Select Work Product" subsection 660, and a "Select Tags" subsection 665. The "Story Type" subsection 655 allows a user to pick from relevant, relevant/non-relevant, and multiple radio buttons. The user selects the relevant radio button to classify documents based on one tag or issue. The user selects the relevant/non-relevant radio button to classify documents based on two source tags. The user selects the multiple radio button to classify documents based on multiple documents that are not just relevant and non-relevant. In some embodiments, the multiple option allows a user to specify up to five different tags or issues.

The "Select Work Product" subsection 660 includes a drop-down menu of different source tags or issues for the story. In some embodiments, a user must specify at least one source tag or issue for the machine-learning model to be generated. The source tags or issues specified in the "Select Work Product" subsection 660 are used to populate the "Select Tags" subsection 665. Those tags may be removed by clicking on the "x" within the tags.

The user interface 650 includes an "Assign Role" section 670 where a user can select different types of reviewers to review the documents and assign them different privileges, such as viewing or editing information related to the set of documents.

Figure 7:
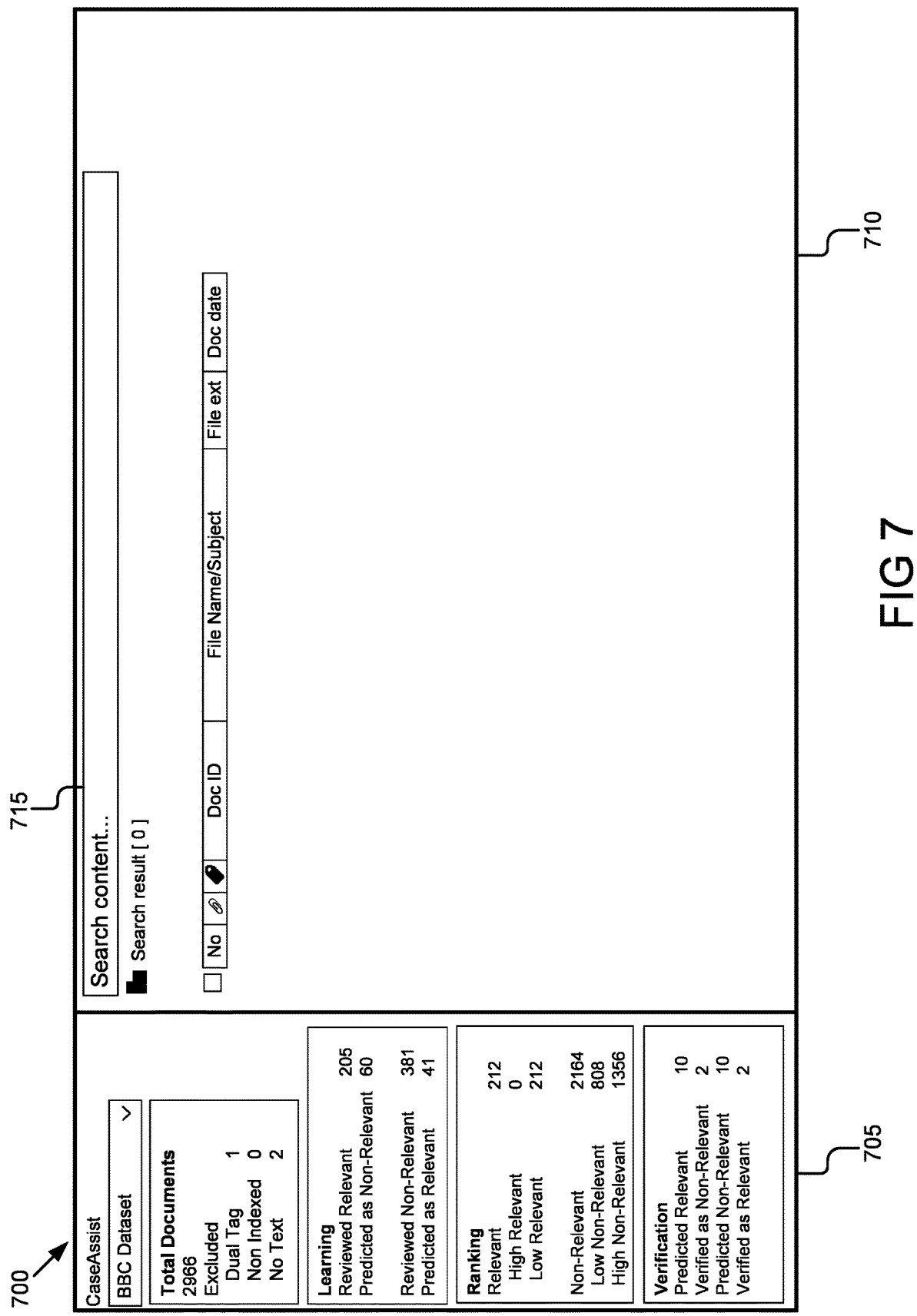
FIG. 7 illustrates an example user interface that includes an overview of a set of documents based on the predictions output by a machine-learning model according to some embodiments.

FIG. 7 illustrates an example user interface 700 that includes an overview window 705 once the machine-learning model outputs predictions and a search pane 710 where search results are displayed according to some embodiments. The overview pane 705 may include total documents, a learning section, a ranking section, and a verification section. In this example, the set of documents includes 2966 documents where three documents were excluded: one for having a dual tag (e.g., where a document is tagged as both relevant and non-relevant as a user) and two where the documents did not have any text. Documents may be excluded for other reasons including that the documents are too large, too small, only contain images, etc.

The learning section includes categorization of documents reviewed by a user and predictions output by the machine-learning model. The documents reviewed by the user are used by the machine-learning module 204 to modify parameters of the machine-learning model. Once enough documents are reviewed and the machine-learning module 204 modifies the parameters, the machine-learning model outputs the predictions. In this example, the learning section includes 205 documents tagged (i.e., labelled) as relevant by the user, 60 documents predicted by the machine-learning model as being non-relevant, 381 documents tagged as non-relevant by the user, and 41 documents predicted by the machine-learning model as being relevant.

The ranking section includes categorization of documents output by the machine-learning model as relevant and non-relevant. The ranking section includes relevant documents that are further categorized as high relevant documents and low relevant documents, and non-relevant documents that are further categorized as low non-relevant documents and high non-relevant documents. In this example, 212 documents are categorized as relevant with all 212 relevant documents also ranked as low relevant, and 2164 documents were categorized as non-relevant with 808 documents being low non-relevant and 1356 documents being high non-relevant.

In some embodiments, the number of relevant and non-relevant documents in the ranking section may be different from the reviewed relevant/non-relevant and predicted as relevant/non-relevant numbers in the learning section. After a user performs the initial review of the documents that is used to modify the parameters of the machine-learning model, the machine-learning module 204 may perform cross-validation of the machine-learning model, which results in the different number of relevant and non-relevant documents.

The verification section includes documents that were identified for the user to verify and the results of the verification. The verification section is generated after the machine-learning model outputs the prediction of relevant and non-relevant documents from the set of documents. In this example, 10 documents were predicted as being relevant and the user verified 2 of those documents as being non-relevant. 10 documents were also predicted as non-relevant and the user verified 2 of those documents as being relevant.

The search pane 710 includes a search field 715 where a user may add a search query to search the set of documents. The search results may then be displayed with a number, an option to view the text, a tag applied to the document, a document identifier, a file name/subject, a file extension, and a document date. Other categories are possible.

Figure 8A:
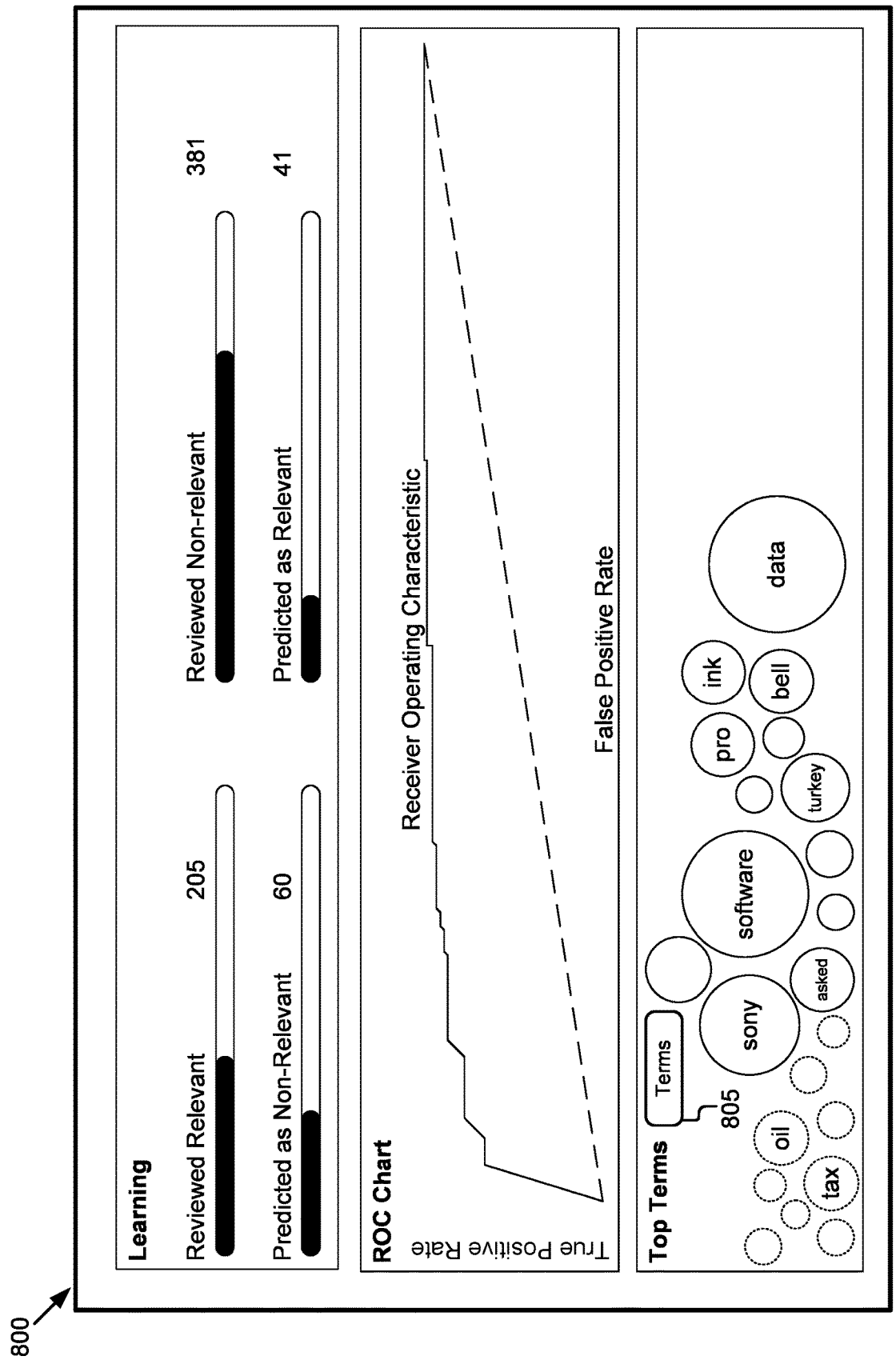
FIG. 8A illustrates an example user interface that provides information about the output of the machine-learning model according to some embodiments.

FIG. 8A illustrates an example user interface 800 that provides information about the output of the machine-learning model according to some embodiments. In some embodiments, selecting the learning section link in FIG. 7 results in the user interface 800 of FIG. 8A being displayed. The user interface 800 includes information about predictions from the machine-learning model and documents reviewed by a user that are a bar graph version of the information in FIG. 7. The user interface 800 also includes a graph of receiver operating characteristic that displays a positive rate of results against the false positive rate. Lastly, the user interface 800 includes top terms in the set of documents that are categorized based on relevant documents and non-relevant documents where the relevant top terms are illustrated with dashed lines. In this example, the top term in the relevant documents is "oil" and the top term in the non-relevant documents (that is visible) is "data." The user may select the "terms" button 805 to add additional terms to make the story more accurate. Once a user selects the "terms" button 810, the user interface 800 updates to display the user interface 850 illustrated in FIG. 8B.

Figure 8B:
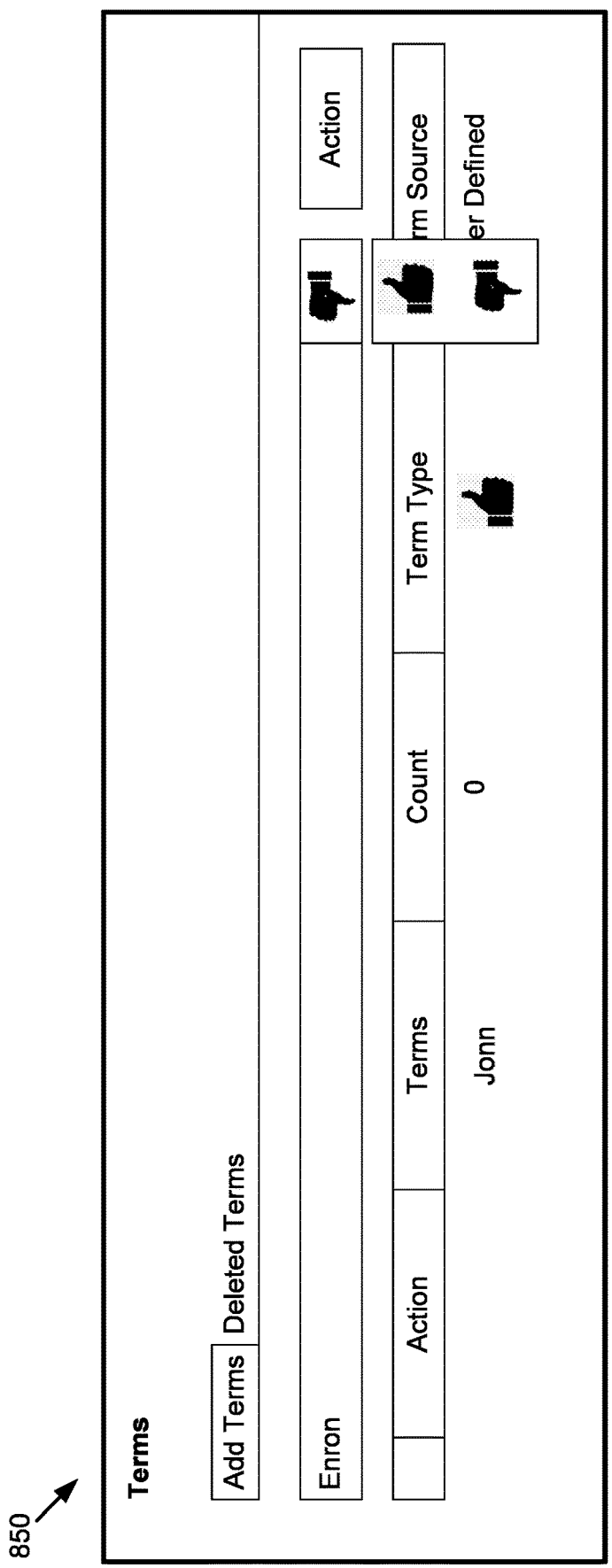
FIG. 8B illustrates an example user interface for a user to define additional terms according to some embodiments.

FIG. 8B illustrates an example user interface 850 for a user to define additional terms according to some embodiments. The user interface 850 includes options for adding terms and defining the terms as relevant or non-relevant terms. The added terms are classified as being "user defined" in the "term source" column. The user interface 850 includes options for deleting added terms as well.

Figure 9A:
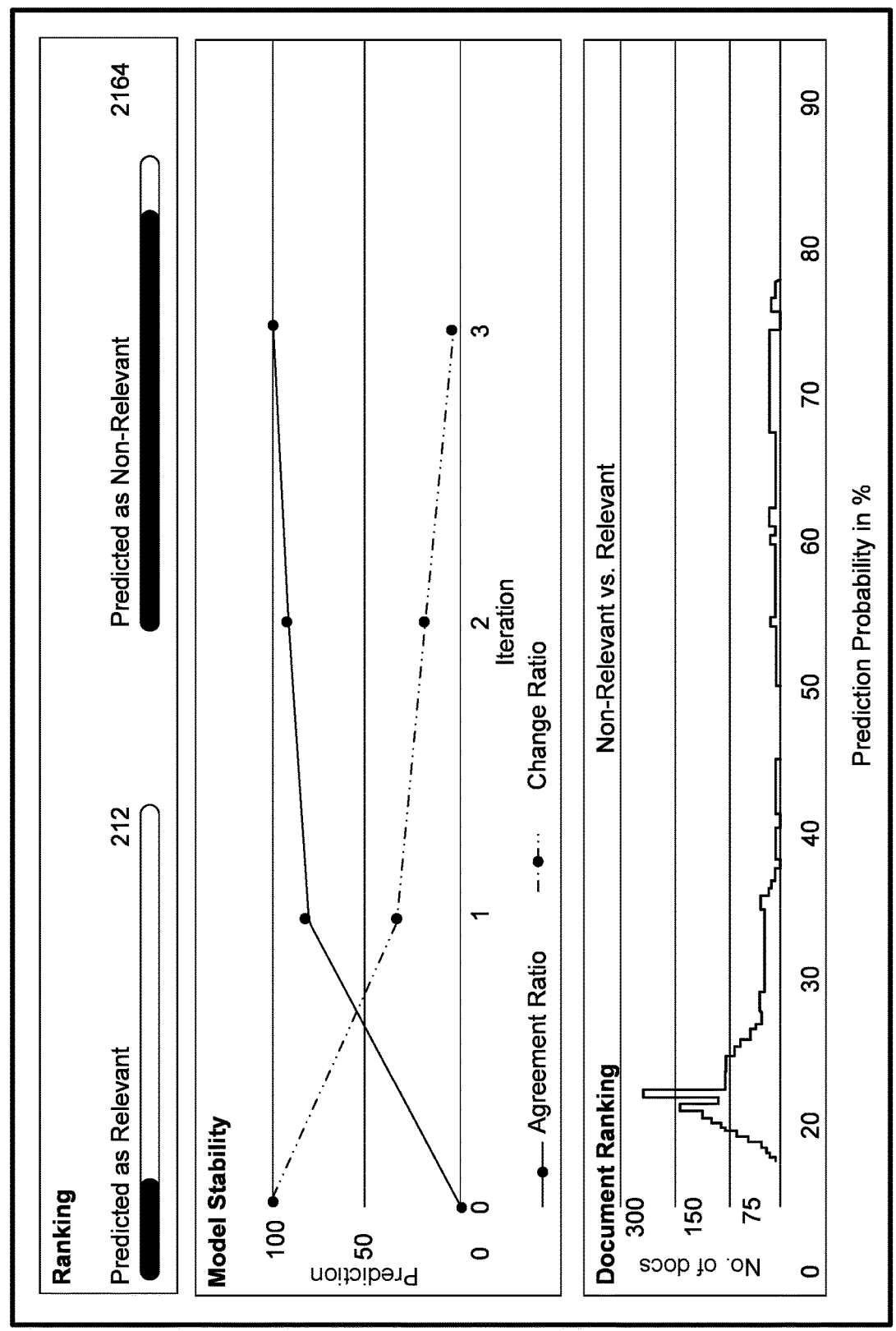
FIG. 9A illustrates an example user interface that includes information about the output of the machine-learning model according to some embodiments.

FIG. 9A illustrates an example user interface 900 that includes information about the output of the machine-learning model according to some embodiments. The user interface 900 includes a ranking section, a model stability section, and a document ranking section. The ranking section includes bar graphs of the number of documents predicted as relevant (colored in black) out of the set of documents and the number of documents predicted as non-relevant (colored in black) out of the set of documents. In this example, 212 documents were predicted as relevant and 2164 documents were predicted as non-relevant.

The model stability section includes prediction of the stability of the machine-learning model as a function of the number of iterations. The prediction includes a prediction probability percentage that a user will agree with the prediction output by the machine-learning model. The iteration reflects a process where, at zero, a user is marking documents with a relevant tag or a non-relevant tag, which causes one or more parameters of the machine-learning model to be modified. At the first iteration, the machine-learning model outputs predictions for by the user and upon receipt of verification input, the machine-learning model then re-ranks the results. In this example, the agreement ratio with the straight line indicates that the machine-learning model has about 80% consistency with how the user marks a document with a relevant tag or a non-relevant tag after the first iteration, about a 95% agreement after the second iteration, and a nearly 100% agreement after the third iteration. In this example, the change ratio with the dashed double dot line indicates that the change is 100% before the first iteration (since the machine-learning model has not generated any prediction at this stage), about 40% at the first iteration, about 20% at the second iteration, and almost 0% at the third iteration.

The document ranking section includes a graph of the number of documents as a function of the prediction probability as a percentage. The line from zero to under 50% prediction probability are for the documents that were identified as non-relevant. In this example, the largest number of documents are at about 23% probability of relevancy. The line from greater than 50% to 100% prediction probability are for the documents that were identified as relevant. In some embodiments, a user may select a range of documents in the document ranking section to review by selecting a subset of documents. For example, the user may click and drag between 48% to under 52% in order to review the corresponding documents and verify that those documents were accurately predicted as relevant or non-relevant by the machine-learning model.

Figure 9B:
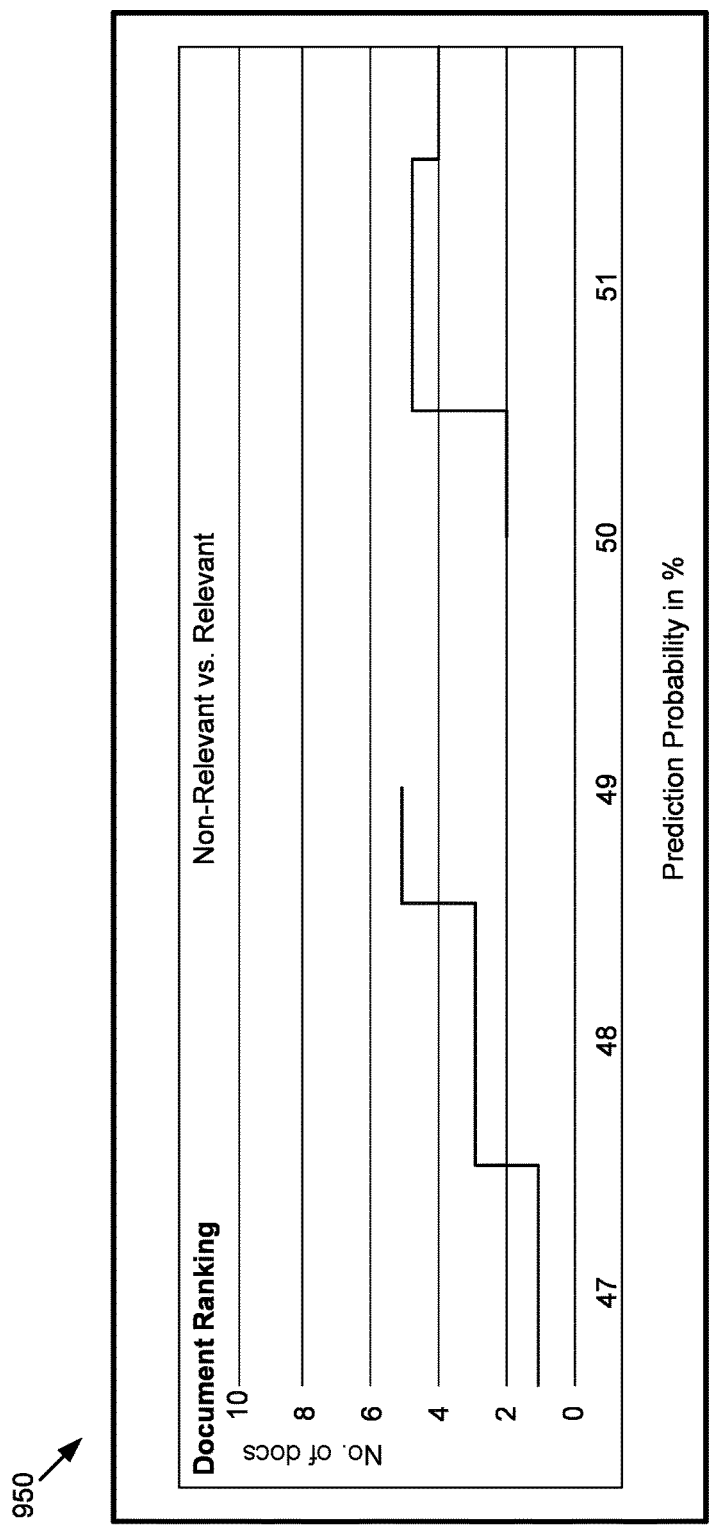
FIG. 9B illustrates another example of the user interface that includes ranking where a user selects a subset of documents for verification according to some embodiments.

FIG. 9B illustrates another example of the user interface 950 illustrates another example of the user interface that includes ranking where a user selects a subset of documents for verification according to some embodiments. In this example, when the user selects a subset of the documents from the document ranking section in FIG. 9A and right clicks on the selection, the user interface 950 in FIG. 9B is illustrated. The user interface 950 includes a load documents button 955 that, when selected by the user, causes the documents to be displayed for verification. Because the cutoff between non-relevant documents and relevant documents is at 50%, documents within a few percentage points of 50% are most likely to be misclassified as relevant or non-relevant.

Figure 10:
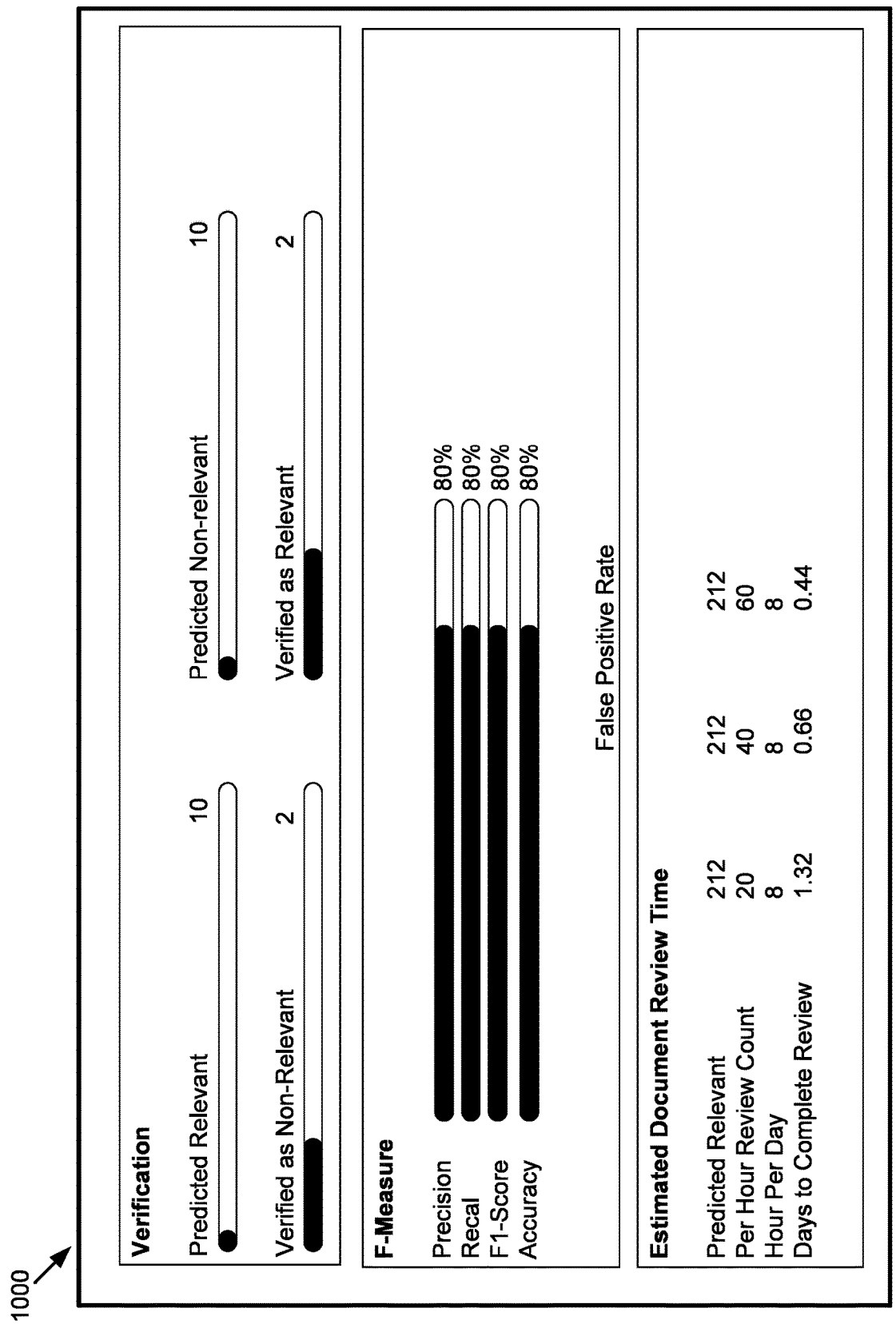
FIG. 10 illustrates an example user interface that provides a view of verification status of the documents categorized by the machine-learning model according to some embodiments.

FIG. 10 illustrates an example user interface 1000 that verification of the documents categorized by the machine-learning model according to some embodiments. The user interface 1000 includes a verification section, an F-measure section, and an estimated document review time. The verification section includes a number of documents that are predicted relevant, verified as non-relevant (i.e., the total number of documents predicted to be relevant, but were verified as non-relevant by a reviewer), predicted non-relevant, and verified as relevant (i.e., the total number of documents predicted to be non-relevant, but were verified as relevant by a reviewer. A user may click on any of the numbers to review the documents in each section. The F-measure section is a measure of the machine-learning model's accuracy and includes data about precision (measure of accuracy of the amount of relevant documents that were predicted), recall (measure of completeness of the total amount of relevant documents that could be predicted), an F1-score (the average precision and recall), and accuracy (measure of closeness to the value of precision) as percentages. The estimated document review time includes the number of predicted relevant documents for three verifications (i.e., three iterations) and provides the review count per hour (i.e., the number of documents that are reviewed per hour), the hours per day that the user works, and the days to complete review for each verification. In this example, the first iteration includes verification of 212 documents at a rate of 20 documents per hour for eight hours a day for a total of 1.32 days to complete the review. The second iteration includes verification of 212 documents at a rate of 40 documents per hour for eight hours a day for a total of 0.66 days to complete review. The third iteration includes verification of 212 documents at a rate of 60 documents per hour for eight hours a day for a total of 0.44 days to complete review.

In some embodiments, after a user performs verification of the machine-learning model by reviewing the set of documents for verification, the user may add a new batch of documents. Once a new batch of documents is added, the discovery application 103 may repeat the same process of learning, ranking, and verification. For example, the processing module 202 may process the new documents, the user may provide tags of relevancy or non-relevancy for a subset of the new documents to indicate whether they are relevant or non-relevant, and the machine-learning module 204 may modify parameters of the machine-learning model based on how the user tagged the new documents.

FIG. 11 illustrates an example user interface 1100 that enables a user to verify a subset of the documents, according to some embodiments. In some embodiments, there are many ways to verify documents where the machine-learning model outputs a prediction of relevancy. In this user interface 1100, the user may select on documents in the ranking section and select different documents for verification. The user right-clicks on the documents identified as being relevant and the user interface 1100 generates a sampling criteria window 1105 with a list of the preconfigured factors that are used to generate the sampling set. In this example, the confidence level is configured to be 95%, the margin of error is configured to be 5% and, because this is applied to the 212 relevant documents, the sample document set is 137. The configurations can be modified by a user with the user interface 600 illustrated in FIG. 6. The user may be able to override the sample document set and change it to a higher or lower number. Once the user is satisfied, the user can select the generate verification quality control (QC) set button 1110 to generate the sample document set for verification. Selecting the generate verification QC set button 1110 may result in the user interface module 206 providing the user interface 1000 in FIG. 10.

Example Methods

Figure 12:
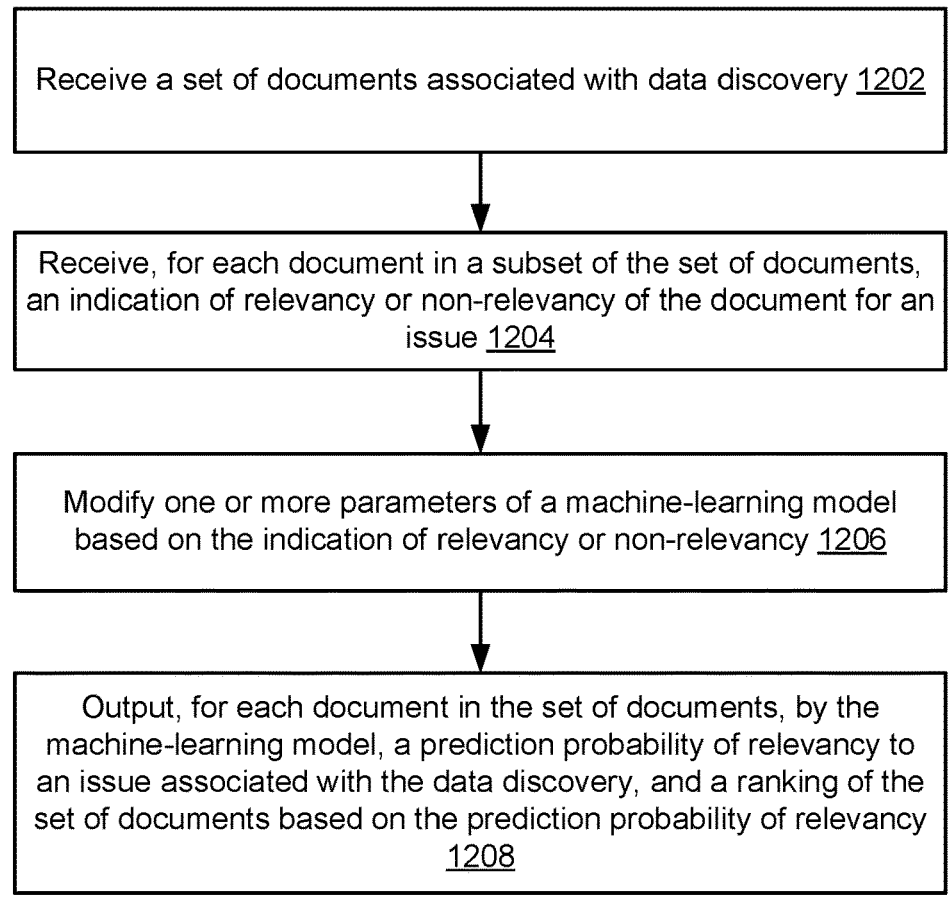
FIG. 12 illustrates a flowchart of an example method to train a machine-learning model and output a prediction of relevancy and a ranking of a set of documents according to some embodiments.

FIG. 12 illustrates a flowchart of an example method to train a machine-learning model and output a prediction of relevancy and a ranking of a set of documents. The method 1200 is performed by a discovery application 103 stored on a computing device 200, such as a user device 115, a discovery server 101, or in part a user device 115 and in part a discovery server 101.

At block 1202, a set of documents associated with data discovery are received. The set of documents may be associated with an issue, such as privilege or a cause of action. Block 1202 may be followed by block 1204.

At block 1204, for each document in a subset of the set of documents, an indication of relevancy or non-relevancy of the document for an issue is received. For example, a user may tag each document in the subject with a relevant tag or a non-relevant tag. Block 1204 may be followed by block 1206.

At block 1206, one or more parameters of the machine-learning model are modified based on the indication of relevancy or non-relevancy. Block 1206 may be followed by block 1208.

At block 1208, for each document in the set of documents, output by a machine-learning model, a prediction probability of relevancy to an issue associated with the data discovery, and a ranking of the set of documents based on the prediction probability of relevancy.

Figure 13:
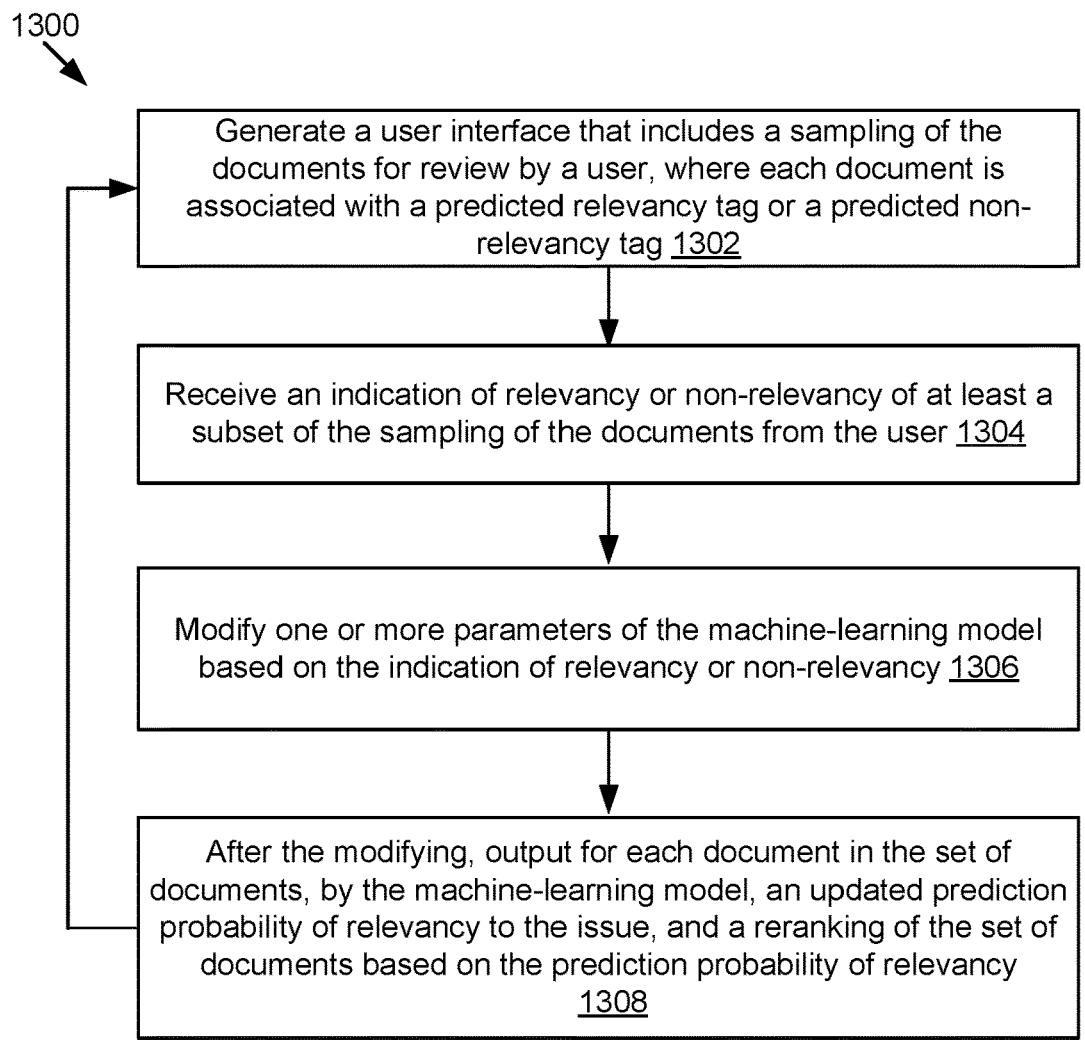
FIG. 13 illustrates a flowchart of an example method to verify predictions output by the machine-learning model according to some embodiments.

FIG. 13 illustrates a flowchart of an example method 1300 to verify predictions output by the machine-learning model. The method 1300 is performed by a discovery application 103 stored on a computing device 200, such as a user device 115, a discovery server 101, or in part a user device 115 and in part a discovery server 101.

At block 1302, a user interface is generated that includes a sampling of the documents for review by a user, where each document is associated with a predicted relevancy tag or a predicted non-relevancy tag. For example, the discovery application 103 may identify a certain percentage of documents with predicted relevancy to be reviewed by a user. Block 1302 may be followed by block 1304.

At block 1304, an indication of relevancy or non-relevancy of at least a subset of the sampling of the documents from the user is received. The indication of relevancy or non-relevancy may confirm or reject the prediction output by the machine-learning model. Block 1304 may be followed by block 1306.

At block 1306, one or more parameters of the machine-learning model are modified based on the indication of relevancy or non-relevancy. Block 1306 may be followed by block 1308.

At block 1308, after the modifying, output for each document in the set of documents, by the machine-learning model, an updated prediction probability of relevancy to the issue, and a reranking of the set of documents based on the prediction probability of relevancy. Block 1308 may be followed by block 1302 when the user performs a subsequent verification of a sampling of the documents.

Figure 14:
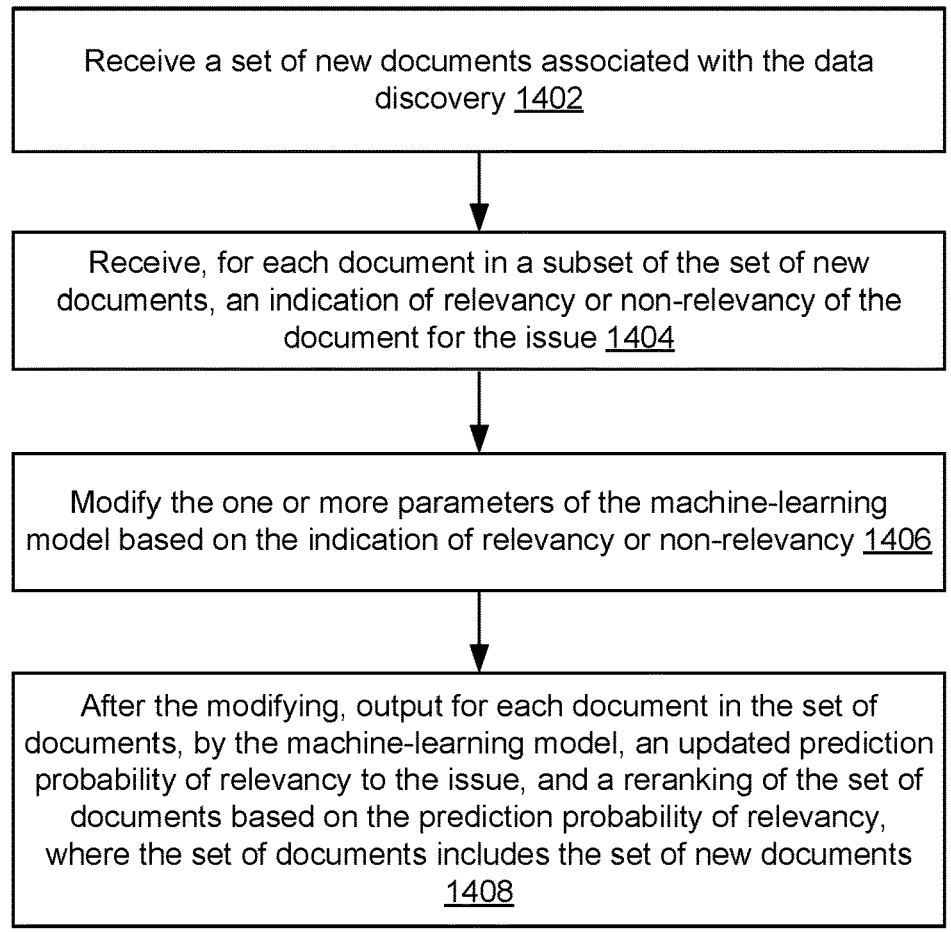
FIG. 14 illustrates a flowchart of an example method to modify parameters of the machine-learning model based on adding a new set of documents to the set of documents according to some embodiments.

FIG. 14 illustrates a flowchart 1400 of an example method to modify parameters of the machine-learning model based on adding a new set of documents to the set of documents according to some embodiments.

At block 1402, a set of new documents associated with the data discovery are received. The set of new documents may be added via a user interface, such as the one illustrated in FIG. 4. The set of new documents are added to the set of documents. Block 1402 may be followed by block 1404.

At block 1404, for each document in a subset of the set of new documents, an indication of relevancy or non-relevancy of the document for the issue is received. The issue is the same issue discussed in FIG. 13. Block 1404 may be followed by block 1406.

At block 1406, the one or more parameters of the machine-learning model are modified based on the indication of relevancy or non-relevancy. Block 1406 may be followed by block 1408.

At block 1408, after the modifying, each document in the set of documents, the machine-learning module outputs an updated prediction probability of relevancy to the issue and a reranking of the set of documents based on the prediction probability of relevancy, where the set of documents includes the set of new documents.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to train a machine-learning model, the method comprising:
   receiving a set of documents associated with data discovery;
   outputting for each document in the set of documents, by the machine-learning model, a prediction probability of relevancy to an issue associated with the data discovery, and a ranking of the set of documents based on the prediction probability of relevancy;
   generating a user interface that includes a sampling of the documents for review by a user, wherein each document in the sampling of the documents is associated with a predicted relevancy tag or a predicted non-relevancy tag;
   receiving user input that modifies the predicted relevancy tag or the predicted non-relevancy tag for one or more documents in the sampling of documents;
   modifying, as a first iteration, the machine-learning model based on the user input;
   in response to modifying the machine-learning model, generating a reranking of the set of documents;
   updating the user interface to include a first graph of prediction of stability of the machine-learning model based on a number of iterations, an agreement ratio between the machine-learning model and the user, and a change ratio;
   receiving additional user input on the reranking of the set of documents;
   modifying, as a second iteration, the machine-learning model based on the additional user input;
   in response to modifying the machine-learning model, generating an additional reranking of the set of documents; and
   updating the user interface to update the first graph of the prediction of stability of the machine-learning model, wherein the machine-learning model is more stable after the second iteration than after the first iteration.

2. The method of claim 1, wherein before outputting the prediction probability of relevancy and ranking, the method further comprises:
   receiving, for each document in a subset of the set of documents, an indication of relevancy or non-relevancy for the issue; and
   modifying one or more parameters of the machine-learning model based on the indication of relevancy or non-relevancy.

3. The method of claim 2, wherein the issue is a first issue, the subset is a first subset, the machine-learning model is a first machine-learning model, and further comprising:
   receiving, for each document in a second subset of the set of documents, an indication of relevancy or non-relevancy for a second issue different from the first issue; and
   outputting for each document in the set of documents, by a second machine-learning model, a second prediction probability of relevancy to the second issue.

4. The method of claim 1, wherein the user interface further includes a second graph of a number of the set of documents as a function of the prediction probability, the method further comprising:
   receiving, from the user, a selection of a span of prediction probabilities in the second graph and a request to verify corresponding documents that are within the span of prediction probabilities; and
   modifying the user interface to include one or more of the corresponding documents for the user to verify relevancy or non-relevancy.

5. The method of claim 1, wherein:
   the user interface further includes a summary of the ranking of the set of documents; and
   the summary includes a number of relevant documents, a number of high-relevant documents, a number of low-relevant documents, a number of non-relevant documents, a number of low non-relevant documents, and a number of high non-relevant documents.

6. The method of claim 5, wherein criteria for definition of the number of high-relevant documents, the number of low-relevant documents, the number of low non-relevant documents, and the number of high non-relevant documents is configurable by the user.

7. The method of claim 5, further comprising:
   receiving, from the user, a request to verify one of the number of relevant documents, the number of high-relevant documents, the number of low-relevant document, the number of non-relevant documents, the number of low non-relevant documents, or the number of high non-relevant documents; and
   modifying the user interface to include corresponding documents from the request for the user to verify relevancy or non-relevancy.

8. The method of claim 1, further comprising:
   receiving a set of new documents associated with the data discovery;
   receiving, for each document in a subset of new documents, an indication of relevancy or non-relevancy of the document;
   modifying one or more parameters of the machine-learning model based on the indication of relevancy or non-relevancy; and
   after the modifying, outputting for each document in the set of documents, by the machine-learning model, an updated prediction probability of relevancy, and the reranking of the set of documents based on the prediction probability of relevancy;

wherein the set of documents includes the set of new documents.

9. A system comprising:
one or more processors; and
a memory coupled to the processor, with instructions stored thereon that, when executed by the processor, cause the processor to perform operations comprising:
receiving a set of documents associated with data discovery;
outputting for each document in the set of documents, by a machine-learning model, a prediction probability of relevancy to an issue associated with the data discovery, and a ranking of the set of documents based on the prediction probability of relevancy;
generating a user interface that includes a sampling of the documents for review by a user, wherein each document in the sampling of the documents is associated with a predicted relevancy tag or a predicted non-relevancy tag; receiving, as a first iteration, user input that modifies the predicted relevancy tag or the predicted non-relevancy tag for one or more documents in the sampling of documents;
receiving user input that modifies the predicted relevancy tag or the predicted non-relevancy tag for one or more documents in the sampling of documents;
modifying, as a first iteration, the machine-learning model based on the user input;
in response to modifying the machine-learning model, generating a reranking of the set of documents;
updating the user interface to include a first graph of prediction of stability of the machine-learning model based on a number of iterations, an agreement ratio between the machine-learning model and the user, and a change ratio;
receiving additional user input on the reranking of the set of documents;
modifying, as a second iteration, the machine-learning model based on the additional user input;
in response to modifying the machine-learning model, generating an additional reranking of the set of documents; and
updating the user interface to update the first graph of the prediction of stability of the machine-learning model, wherein the machine-learning model is more stable after the second iteration than after the first iteration.

10. The system of claim 9, wherein before outputting the prediction probability of relevancy and ranking, the operations further comprise:
receiving, for each document in a subset of the set of documents, an indication of relevancy or non-relevancy for the issue; and
modifying one or more parameters of the machine-learning model based on the indication of relevancy or non-relevancy.

11. The system of claim 9, wherein the user interface further includes a second graph of a number of the set of documents as a function of the prediction probability and the operations further comprise:
receiving, from the user, a selection of a span of prediction probabilities in the second graph and a request to verify corresponding documents that are within the span of prediction probabilities; and
modifying the user interface to include one or more of the corresponding documents for the user to verify relevancy or non-relevancy.

12. The system of claim 9, wherein:
the user interface further includes a summary of the ranking of the set of documents; and
the summary includes a number of relevant documents, a number of high-relevant documents, a number of low-relevant documents, a number of non-relevant documents, a number of low non-relevant documents, and a number of high non-relevant documents.

13. A non-transitory computer-readable medium with instructions stored thereon that, when executed by one or more computers, cause the one or more computers to perform operations, the operations comprising:
receiving a set of documents associated with data discovery;
outputting for each document in the set of documents, by a machine-learning model, a prediction probability of relevancy to an issue associated with the data discovery, and a ranking of the set of documents based on the prediction probability of relevancy;
generating a user interface that includes a sampling of the documents for review by a user, wherein each document in the sampling of the documents is associated with a predicted relevancy tag or a predicted non-relevancy tag;
receiving user input that modifies the predicted relevancy tag or the predicted non-relevancy tag for one or more documents in the sampling of documents;
modifying, as a first iteration, the machine-learning model based on the user input;
in response to modifying the machine-learning model, generating a reranking of the set of documents;
updating the user interface to include a first graph of prediction of stability of the machine-learning model based on a number of iterations, an agreement ratio between the machine-learning model and the user, and a change ratio;
receiving additional user input on the reranking of the set of documents;
modifying, as a second iteration, the machine-learning model based on the additional user input;
in response to modifying the machine-learning model, generating an additional reranking of the set of documents; and
updating the user interface to update the first graph of the prediction of stability of the machine-learning model, wherein the machine-learning model is more stable after the second iteration than after the first iteration.

14. The computer-readable medium of claim 13, wherein the user interface further includes a second graph of a number of documents as a function of prediction probability of relevancy.

15. The computer-readable medium of claim 14, wherein before outputting the prediction probability of relevancy and ranking, the operations further comprise:
receiving, for each document in a subset of the set of documents, an indication of relevancy or non-relevancy for the issue; and
modifying one or more parameters of the machine-learning model based on the indication of relevancy or non-relevancy.

16. The computer-readable medium of claim 13, wherein before outputting the prediction probability of relevancy and ranking, the operations further comprise:
receiving, for each document in a subset of the set of documents, an indication of relevancy or non-relevancy for the issue; and modifying one or more parameters of the machine-learning model based on the indication of relevancy or non-relevancy.

\* \* \* \* \*